(12) United States Patent
Campbell et al.

(10) Patent No.: US 12,375,841 B2
(45) Date of Patent: Jul. 29, 2025

(54) POWER MANAGEMENT OF THE MODULAR EAR-CUP AND EAR-BUD

(71) Applicant: NURA HOLDINGS PTY LTD, Brunswick (AU)

(72) Inventors: Luke John Campbell, Brunswick (AU); Dragan Petrovic, Union City, CA (US)

(73) Assignee: Nura Holdings Pty Ltd, Brunswick (AU)

( * ) Notice: Subject to any disclaimer, the term of this patent is extended or adjusted under 35 U.S.C. 154(b) by 0 days.

(21) Appl. No.: 18/414,050

(22) Filed: Jan. 16, 2024

(65) Prior Publication Data

US 2024/0276134 A1 Aug. 15, 2024

Related U.S. Application Data

(63) Continuation of application No. 17/349,875, filed on Jun. 16, 2021, now Pat. No. 11,910,145, which is a
(Continued)

(51) Int. Cl.
*H04R 1/10* (2006.01)
*G10K 11/178* (2006.01)
(Continued)

(52) U.S. Cl.
CPC ..... *H04R 1/1008* (2013.01); *G10K 11/17885* (2018.01); *H02J 50/10* (2016.02);
(Continued)

(58) Field of Classification Search
CPC .. H04R 1/1008; H04R 1/1016; H04R 1/1025; H02J 50/10; G10K 11/17885
See application file for complete search history.

(56) References Cited

U.S. PATENT DOCUMENTS 5,776,179 A 7/1998 Ren et al.
6,104,819 A 8/2000 Nickum
(Continued)

FOREIGN PATENT DOCUMENTS

CN 104 545 940 4/2015
CN 109 068 205 12/2018
(Continued)

OTHER PUBLICATIONS

U.S. Appl. No. 61/224,531, filed Jul. 10, 2009, Parkins.
(Continued)

*Primary Examiner* — Simon King
(74) *Attorney, Agent, or Firm* — Knobbe, Martens, Olson & Bear, LLP

(57) ABSTRACT

Introduced here is a wearable audio system including modular ear-cup and ear-bud that can be attached and detached to the user together, or independently of each other. Further, the modular ear-cup and ear-bud can operate together, or independently of each other. The wearable audio system can perform active noise cancellation by measuring noise inside the ear-cup and/or the ear-bud, computing the noise canceling sound, and forwarding the noise canceling sound to a speaker inside the ear-cup and/or the ear-bud. The wearable audio system can be wirelessly charged while operating, thus allowing the user to continuously listen to music more than previously possible. The wearable audio system can optimize power consumption by redistributing power intensive tasks to power sources with the highest amount of power. Further, the ambient sound outside the ear-cup can be measured and played by the speakers in the earbud allowing the user to hear the surrounding environment.

15 Claims, 15 Drawing Sheets

Related U.S. Application Data continuation of application No. PCT/US2019/066984, filed on Dec. 17, 2019.

(60) Provisional application No. 62/784,143, filed on Dec. 21, 2018.

(51) Int. Cl.
    *H02J 50/10* (2016.01)
    *H04R 5/033* (2006.01)
    *H02J 7/34* (2006.01)

(52) U.S. Cl.
    CPC ......... *H04R 1/1016* (2013.01); *H04R 1/1025* (2013.01); *H04R 1/1083* (2013.01); *H04R 5/033* (2013.01); *G10K 2210/1081* (2013.01); *H02J 7/345* (2013.01); *H04R 2420/07* (2013.01)

(56) References Cited

U.S. PATENT DOCUMENTS

| | | | |
|---|---|---|---|
| 7,399,282 B2 | 7/2008 | John et al. | |
| 7,529,370 B1 | 5/2009 | Zhang et al. | |
| 7,587,052 B2 | 9/2009 | Kasztelan | |
| D657,499 S | 4/2012 | Parkins et al. | |
| 8,213,649 B2 | 7/2012 | Goldstein et al. | |
| 8,277,390 B2 | 10/2012 | Jennsen et al. | |
| 8,682,010 B2 | 3/2014 | Macours | |
| 8,688,036 B2 | 4/2014 | Parkins et al. | |
| 8,693,720 B2 | 4/2014 | Parkins | |
| 8,840,565 B2 | 9/2014 | Keefe | |
| 9,083,388 B2 | 7/2015 | Parkins | |
| 9,137,609 B2 | 9/2015 | Bruss et al. | |
| 9,173,045 B2 | 10/2015 | Bruss et al. | |
| 9,210,498 B1* | 12/2015 | Shaffer | H02J 50/90 |
| 9,313,577 B2 | 4/2016 | Bodvarsson et al. | |
| 9,332,364 B2 | 5/2016 | Goldstein | |
| 9,351,064 B2 | 5/2016 | Parkins | |
| 9,401,158 B1 | 7/2016 | Yen et al. | |
| 9,497,530 B1 | 11/2016 | Campbell et al. | |
| 9,516,404 B2 | 12/2016 | Parkins | |
| 9,525,930 B2 | 12/2016 | Parkins | |
| 9,654,876 B2 | 5/2017 | Neely | |
| 9,748,914 B2 | 8/2017 | Antonellis et al. | |
| 9,774,946 B2 | 9/2017 | Parkins | |
| 9,794,672 B2 | 10/2017 | Campbell et al. | |
| 9,877,117 B2 | 1/2018 | Sabin | |
| 9,894,441 B2 | 2/2018 | Bang et al. | |
| 9,924,261 B2 | 3/2018 | Parkins | |
| 9,949,048 B2 | 4/2018 | Isberg et al. | |
| 10,051,460 B2 | 8/2018 | Bran | |
| 10,154,333 B2 | 12/2018 | Campbell et al. | |
| 10,165,345 B2 | 12/2018 | Slater et al. | |
| 10,292,626 B2 | 5/2019 | Coninx | |
| 10,357,403 B2 | 7/2019 | Parkins | |
| 10,448,143 B2 | 10/2019 | Parkins | |
| 10,448,144 B2 | 10/2019 | Parkins | |
| 10,536,763 B2 | 1/2020 | Slater et al. | |
| 10,561,347 B2 | 2/2020 | Dalhoff et al. | |
| 10,621,973 B1 | 4/2020 | McVicker et al. | |
| 10,679,621 B1 | 6/2020 | Sundaram et al. | |
| 10,708,680 B2 | 7/2020 | Campbell et al. | |
| 10,979,836 B2 | 4/2021 | Usher et al. | |
| 11,006,225 B2 | 5/2021 | Greenberg et al. | |
| 11,024,421 B2 | 6/2021 | Dalhoff et al. | |
| 11,144,646 B2 | 10/2021 | Maretti et al. | |
| 11,202,159 B2 | 12/2021 | Boley et al. | |
| 11,910,145 B2 | 2/2024 | Campbell et al. | |
| 11,995,201 B2 | 5/2024 | Campbell et al. | |
| 12,106,752 B2 | 10/2024 | Campbell et al. | |
| 12,200,421 B2 | 1/2025 | Campbell et al. | |
| 2005/0090372 A1 | 4/2005 | Burrows et al. | |
| 2005/0251273 A1 | 11/2005 | Bychowsky et al. | |
| 2006/0045294 A1 | 3/2006 | Smyth | |
| 2006/0153396 A1 | 7/2006 | John | |
| 2007/0155313 A1 | 7/2007 | Goldberg et al. | |
| 2007/0270988 A1 | 11/2007 | Goldstein et al. | |
| 2008/0205660 A1 | 8/2008 | Goldstein | |
| 2008/0219486 A1 | 9/2008 | Goldstein et al. | |
| 2008/0260169 A1 | 10/2008 | Reuss | |
| 2008/0285780 A1 | 11/2008 | Aarts | |
| 2008/0318518 A1 | 12/2008 | Coutinho et al. | |
| 2010/0119093 A1 | 5/2010 | Uzuanis et al. | |
| 2011/0206217 A1 | 8/2011 | Weis | |
| 2011/0268281 A1 | 11/2011 | Florencio et al. | |
| 2012/0051548 A1 | 3/2012 | Visser et al. | |
| 2012/0095749 A1 | 4/2012 | Capretta | |
| 2012/0159617 A1 | 6/2012 | Wu et al. | |
| 2012/0183165 A1* | 7/2012 | Foo | G06F 40/58 381/314 |
| 2012/0282976 A1 | 11/2012 | Suhami | |
| 2013/0028437 A1 | 1/2013 | Bruss et al. | |
| 2013/0191115 A1 | 7/2013 | Suzuki et al. | |
| 2013/0216052 A1 | 8/2013 | Bruss et al. | |
| 2013/0246059 A1 | 9/2013 | Kechichian et al. | |
| 2014/0031426 A1 | 1/2014 | Destaillats et al. | |
| 2014/0044269 A1 | 2/2014 | Anderson | |
| 2014/0044281 A1* | 2/2014 | Ganem | B60L 50/20 381/384 |
| 2014/0044293 A1* | 2/2014 | Ganem | H04R 3/00 381/74 |
| 2014/0050334 A1 | 2/2014 | Antonellis et al. | |
| 2014/0162556 A1 | 6/2014 | Dua | |
| 2014/0247952 A1 | 9/2014 | Goldstein | |
| 2014/0314261 A1 | 10/2014 | Selig et al. | |
| 2015/0073794 A1 | 3/2015 | Kalinli-Akbacak et al. | |
| 2015/0162767 A1 | 6/2015 | Oh et al. | |
| 2015/0179178 A1 | 6/2015 | Usher et al. | |
| 2015/0257683 A1 | 9/2015 | Ashmore et al. | |
| 2015/0281853 A1 | 10/2015 | Eisner et al. | |
| 2015/0334484 A1 | 11/2015 | Usher et al. | |
| 2016/0014492 A1 | 1/2016 | McCarthy et al. | |
| 2016/0076858 A1* | 3/2016 | Howes | A63B 71/06 273/371 |
| 2016/0267899 A1 | 9/2016 | Gauger, Jr. et al. | |
| 2017/0032801 A1 | 2/2017 | Baumgarte | |
| 2017/0064429 A1* | 3/2017 | Hirsch | H04W 52/0254 |
| 2017/0064434 A1 | 3/2017 | Campbell et al. | |
| 2017/0116995 A1 | 4/2017 | Ady et al. | |
| 2017/0127196 A1* | 5/2017 | Blum | H04R 25/554 |
| 2017/0178631 A1 | 6/2017 | Boesen | |
| 2017/0195806 A1* | 7/2017 | Atamaniuk | H04R 25/554 |
| 2017/0208380 A1 | 7/2017 | Slater et al. | |
| 2017/0231345 A1* | 8/2017 | Gronewoller | H04M 1/0258 455/575.8 |
| 2017/0332186 A1 | 11/2017 | Riggs et al. | |
| 2018/0083468 A1* | 3/2018 | Dennis | H02J 7/342 |
| 2018/0124527 A1 | 5/2018 | El-Hoiydi et al. | |
| 2018/0336918 A1 | 11/2018 | Zadgaonkar et al. | |
| 2018/0367882 A1 | 12/2018 | Watts et al. | |
| 2018/0376235 A1 | 12/2018 | Leabman et al. | |
| 2019/0075383 A1 | 3/2019 | Slater et al. | |
| 2019/0076058 A1 | 3/2019 | Piechowiak et al. | |
| 2019/0110929 A1* | 4/2019 | Persson | H04R 1/1041 |
| 2019/0159702 A1 | 5/2019 | Charaziak et al. | |
| 2019/0261089 A1 | 8/2019 | Hariharan et al. | |
| 2019/0325887 A1 | 10/2019 | Karkkainen et al. | |
| 2020/0184996 A1 | 6/2020 | Steele et al. | |
| 2020/0196977 A1 | 6/2020 | Martin et al. | |
| 2020/0268288 A1 | 8/2020 | Dalhoff et al. | |
| 2020/0296500 A1 | 9/2020 | Wang | |
| 2020/0374646 A1 | 11/2020 | Lee et al. | |
| 2021/0314691 A1 | 10/2021 | Campbell et al. | |
| 2021/0314692 A1 | 10/2021 | Campbell et al. | |
| 2022/0070604 A1 | 3/2022 | Campbell et al. | |
| 2025/0061894 A1 | 2/2025 | Campbell et al. | |

FOREIGN PATENT DOCUMENTS

| | | |
|---|---|---|
| EP | 2 009 620 | 11/2012 |
| EP | 2 202 998 | 2/2014 |
| JP | 2014-154956 | 8/2014 |

(56) References Cited

FOREIGN PATENT DOCUMENTS

| WO | WO 01/024576    | 4/2001  |
|----|-----------------|---------|
| WO | WO 2007/131815  | 11/2007 |
| WO | WO 2008/087614  | 7/2008  |
| WO | WO 2008/116462  | 10/2008 |
| WO | WO 2011/146903  | 11/2011 |
| WO | WO 2014/079549  | 5/2014  |
| WO | WO 2017/040327  | 3/2017  |
| WO | WO 2018/087570  | 5/2018  |
| WO | WO 2018/146609  | 8/2018  |
| WO | WO 2020/131963  | 6/2020  |
| WO | WO 2020/132576  | 6/2020  |
| WO | WO 2020/180499  | 9/2020  |

OTHER PUBLICATIONS

International Search Report and Written Opinion mailed on Apr. 27, 2020 for International Application No. PCT/US2019/066984, filed on Dec. 17, 2019 (13 pages).

* cited by examiner

POWER MANAGEMENT OF THE MODULAR EAR-CUP AND EAR-BUD

This application is a continuation of U.S. patent application Ser. No. 17/349,875, filed Jul. 16, 2021, titled "MODULAR EAR-CUP AND EAR-BUD AND POWER MANAGEMENT OF THE MODULAR EAR-CUP AND EAR-BUD," which claims benefit of International Patent Application No. PCT/US2019/066984, filed on Dec. 17, 2019, titled "MODULAR EAR-CUP AND EAR-BUD AND POWER MANAGEMENT OF THE MODULAR EAR-CUP AND EAR-BUD," which claims the benefit of U.S. Provisional Patent Application No. 62/784,143 filed on Dec. 21, 2018, titled "MODULAR EAR-CUP AND EAR-BUD AND POWER MANAGEMENT OF THE MODULAR EAR-CUP AND EAR-BUD" each of which is incorporated by reference herein in its entirety.

TECHNICAL FIELD

The present application is related to wearable audio systems, and more specifically to methods and systems that include ear-cups and ear-buds.

BACKGROUND

Currently, wearable audio systems work on an assumption that all users hear the same and produce an audio signal independent of the user's audio perception. Further, the wearable audio systems consist of standalone ear-cups or standalone ear-buds. The ear-buds, because of their small size, can include a small power source allowing the user to continuously listen to music for a limited period of time. Once the power source is drained, the ear-buds need to be removed from the user to be charged, prior to the next usage.

SUMMARY

Introduced here is a wearable audio system including modular ear-cup and ear-bud that can be attached and detached to the user together, or independently of each other. Further, the modular ear-cup and ear-bud can operate together, or independently of each other. The wearable audio system can perform active noise cancellation by measuring noise inside or outside the ear-cup and/or the ear-bud, computing the noise canceling sound, and forwarding the noise canceling sound to a speaker inside the ear-cup and/or the ear-bud. The wearable audio system can be wirelessly charged while operating, thus allowing the user to continuously listen to music longer than previously possible. In addition, the wearable audio system can optimize power consumption by redistributing power intensive tasks to power sources with the highest amount of power. Further, the ambient sound outside the ear-cup can be measured and played by the speakers in the earbud allowing the user to hear the surrounding environment.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
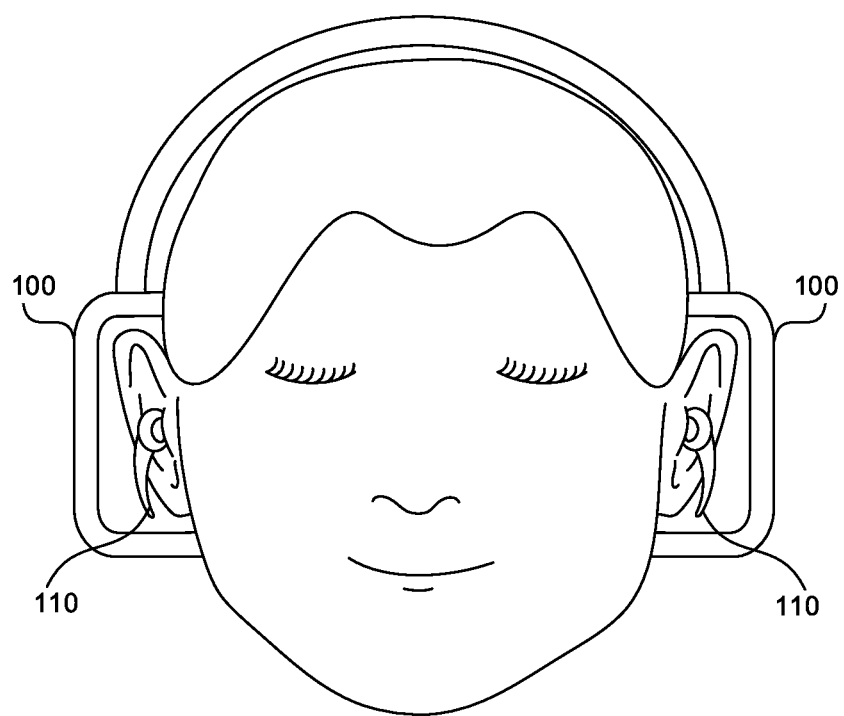
FIG. 1 shows a wearable audio system.

Brief definitions of terms, abbreviations, and phrases used throughout this application are given below.

Reference in this specification to "power" can include energy as well as energy per unit time, depending on a context. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Modular Ear-Cups and Ear-Buds

FIG. 1 shows a wearable audio system. The wearable audio system can include modular ear-cups 100 and ear-buds 110. The ear-cups and ear-buds are modular because the ear-cups and ear-buds can be attached and detached separately from a user and can function independently of each other or in coordination with each other.

The ear-cups 100 can be placed on top or around the user's ears and can accommodate ear-buds 110 that can be inserted into the user's ears at the same time. The ear-cups 100 can surround the user's ear lobe and/or can press on top of the user's ear lobe. The ear-buds 110 can be wireless and can be fully enclosed within the ear-cups 100. The ear-cups can be box shaped, box shaped with rounded corners, cylindrical, spherical, oval, etc.

The ear-cups 100 and the wireless ear-buds 110 can wirelessly, or via an analog or a digital cable, receive audio to play to the user from a remote source, such as a cell phone, a home device, a tablet, an Internet server, a cellular network, a wifi network, etc. The ear-buds 110 can receive the audio to play from the ear-cups 100, which can receive the audio from the remote source, as mentioned above. The ear-cups 100 and ear-buds 110 can be in wireless communication with each other to synchronize the audio play. For example, the ear-cups 100 can play low audible frequencies, while ear-buds can play mid and high audible frequencies. The ear-cups 100 can cause a vibrotactile stimulation of the skin by emitting low frequencies, for example less than 100 Hz. The ear-buds 110 can emit the full range of audio frequency or frequencies that complement the low frequencies emitted from 100, for example 100 Hz or higher.

Further, the ear-cups 100 and ear-buds 110 can be removed independently from each other and can operate independently of each other. In other words, the user can only use the ear-buds 110 or can only use the ear-cups 100. The ear-cups 100 and ear-buds 110 can personalize the sound based on the user's hearing profile prior to playing, as described in this application.

Figure 2:
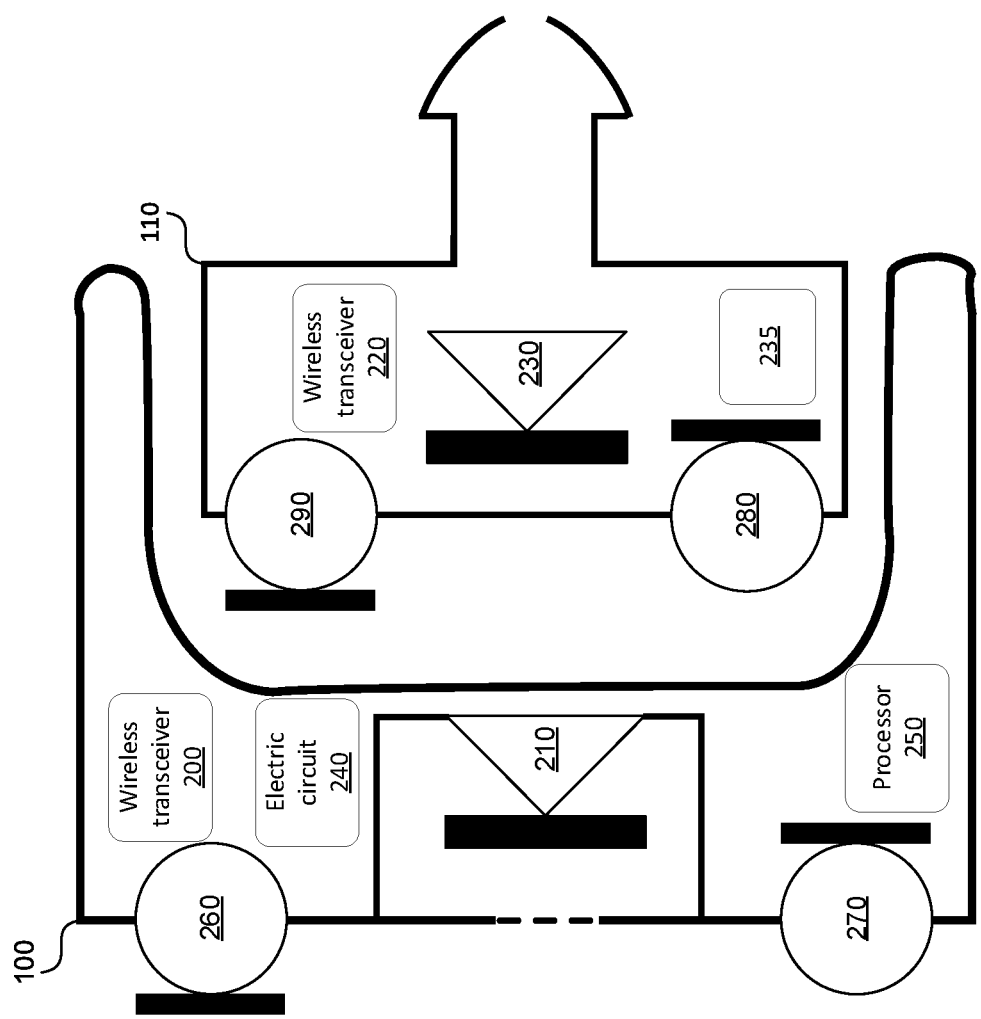
FIG. 2 shows a cross-section of the modular ear-cups and ear-buds.

FIG. 2 shows a cross-section of the modular ear-cups 100 and ear-buds 110. The ear-cup 100 defines a cavity within which ear-bud 110 can be partially or fully contained. The ear-cup 100 can include a first wireless transceiver 200, a first audio emitter 210 to emit a first audio into the user's ear, an externally facing microphone 260, an internally facing microphone 270, a processor 250, and an electric circuit 240. The ear-bud 110 can be placed in proximity to a user's ear canal, such as at the entrance of the user's ear canal or within the user's ear canal. The ear-bud 110 can include a second audio emitter 230 to emit a second audio into the user's ear canal, a processor 235, the second wireless transceiver 220, an externally facing microphone 290 and internally facing microphone 280. The first wireless transceiver 200 and the second wireless transceiver 220 can communicate with each other and can coordinate an operation of the first audio emitter 210 and the second audio emitter 230 to provide the first audio and the second audio to the user. The coordination can include adjusting the timing of the audio played by the first audio emitter 210 and by the second audio emitter 230 or can involve modifying the audio emitted by the audio emitters 210, 230. The coordination can include splitting an incoming audio signal into low frequencies sent to the audio emitter 210, and high frequencies sent to the audio emitter 230. The first wireless transceiver 200 and the second wireless transceiver 220 can communicate with each other and can coordinate between microphones 260, 270, 280, 290 and audio emitters 210, 230 for the purposes of Active Noise Cancellation (ANC), pass-through of external audio to the user, voice detection, etc.

The microphone 280 can measure a hearing profile of a user by measuring an acoustic response within the user's ear canal generated in response to the second audio. The hearing profile can correlate an amplitude and/or a frequency perceived by the user and an amplitude and/or a frequency received by the user. For example, the user's ear can receive a frequency of 5 kHz at 20 dB, but the user's ear can perceive that frequency as 5 kHz at 10 dB. Based on the hearing profile, the ear-bud 110 can modify audio prior to emitting the audio to the user, so that the user perceives audio at the desired frequency and/or amplitude.

To create the hearing profile, the audio emitter 230 can emit audio, while the microphone 280 can measure an otoacoustic emission (OAE) response generated in response to the audio within the user's ear canal. The OAE response can be measured automatically, with or without subjective measurement of hearing, that is without asking the user to provide an input whether the user heard the audio, how loud the audio was, etc.

The second wireless transceiver 220 can communicate the hearing profile of the user to the first wireless transceiver 200. Based on the hearing profile of the user, the ear-cup 100 can adjust the first audio to increase the person's enjoyment of music. The ear-bud 110 can also adjust the audio based on the hearing profile of the user. The hearing profile, once measured, can be uploaded to a central location, such as an Internet server, a cell phone, a tablet, a home device, a smartwatch, etc., and can be later downloaded for use by the ear-cups 100 and/or the ear-buds 110.

The ear-cups 100 and the ear-buds 110 can perform wireless active noise cancellation (ANC). There are three types of ANC, feedforward (FF), feedback (FB) and hybrid (H). Feedforward can use an external microphone 260, 290. The processor 250, 235 can calculate the noise cancelling sound from the microphone 260, 290 and pass the noise cancelling sound to an internal speaker 210, 230, respectively. The noise canceling sound can destructively interfere with the undesired sound.

Feedback can use an internal microphone 270, 280. The processor 250, 235 can calculate the noise cancelling sound and pass the noise canceling sound to the internal speaker 210, 230. For example, the microphone 280 of the ear-bud 110 can record an audio, and transmit the recorded audio to the processor 235 or the processor 250 to calculate the noise canceling sound. The speaker 210 can receive the noise canceling sound from the processor 250, or from the processor 235 via the wireless transceiver 200. The speaker 210 can emit the noise canceling sound. Choosing the processor 250 or 235 to perform the noise canceling calculation can depend on how much power the ear-cup 100 or the ear-bud 110 have, respectively.

Hybrid ANC can use both techniques simultaneously. Ear-cups 100 and ear-buds 110 independently can use any combination of FF, FB or H ANC. In some embodiments, the microphone 260, 270, 290, 280 can communicate via a wireless link with the audio emitter in the other device, 230, 210 or the processor 235, 250 respectively.

In an embodiment using FF ANC, the externally facing microphone 260 on the outside of the ear-cups 100 can measure and record the ambient sound. The ear-cups 100 can record the ambient sound and can wirelessly transmit the ambient sound using the wireless transceiver 200 to the wireless transceiver 220 associated with the ear-buds 110. The ear-buds 110 can calculate the noise cancelling sound and play the noise cancelling sound through the audio emitter 230. In another example, the ear-cups 100 can calculate the noise cancelling sound and transmit the noise cancelling sound to the ear-buds 110, which can emit the noise cancelling sound through the audio emitter 230 without calculating the noise cancelling sound. Calculating the noise cancelling sound within the ear-cups can be useful when the ear-buds do not have sufficient power, such as when the power source associated with the ear-buds is low or depleted. For example, after performing the noise cancellation, the audio emitters 210, 230, can personalize the audio prior to emitting the audio to the user based on the hearing profile of the user.

In an embodiment using the FB ANC, the microphone 280 can measure a sound inside the ear-bud 110. The wireless transceiver 220 can transfer the measured sound to the ear-cup 100. The processor 250 of the ear-cup 100 can calculate the noise canceling sound destructively interfering with the received sound and cause the audio emitter 210 to emit the noise canceling sound. As a result, any sound escaping from the ear-bud 110 into the ear-cup 100, can be canceled by the noise canceling sound. Alternatively, the noise canceling sound can be calculated by the processor 235 and the wireless transceiver 220 can transmit the noise canceling sound to the ear-cup 100. Again, the audio emitter 210 can emit the noise canceling sound destructively interfering with any sound escaping from the ear-bud 110.

In another embodiment using the FB ANC, the microphone 270 can measure sound inside the ear-cup 100. The wireless transceiver 200 can transfer the measured sound to the ear-bud 110. The processor 235 of the ear-bud 110 can calculate the noise canceling sound destructively interfering with the received sound and cause the audio emitter 230 to emit the noise canceling sound. As a result, any sound escaping from the ear-cup 100 into the ear-bud 110, can be canceled by the noise canceling sound. Alternatively, the noise canceling sound can be calculated by the processor 250 and the wireless transceiver 200 can transmit the noise canceling sound to the ear-bud 110. Again, the audio emitter 230 can emit the noise canceling sound destructively interfering with any sound escaping from the ear-cup 100.

The ear-cups 100 and ear-buds 110 can operate in a social mode. The externally facing microphone 260 on the outside of the ear-cups 100 can measure the ambient sounds such as an external conversation directed to the user. Without the social mode, the user cannot hear the external conversation because the user has both ear-cups 100 and ear-buds 110 covering his ears. When in social mode, the wireless transceiver 200 of the ear-cups 100 can wirelessly transmit the external conversation, i.e. the ambient sound, to the wireless transceiver 220 of the ear-buds 110, or the wireless transceiver 200 of the ear-cups 100 can transmit the external conversation to the processor 250 of the ear-cups 100. That way, the user can hear the external conversation without taking the ear-cups 100 and the ear-buds 110 off. If the audio emitters 210, 230 have been playing a different audio, such as music, and the ear-cups 100 and ear-buds 110 switch into the social mode, the loudness of the different audio can be reduced, or completely muted, so that the ambient sound can be heard. Further, a filtered or unfiltered version of the ambient sounds measured by microphone 260 can be played by the audio emitters 230 and/or 210 allowing the user to hear the ambient sound.

The ear-cups 100 and ear-buds 110 can switch into the social mode upon receiving an input requesting transmission of the ambient sound, such as a touch of a button or a touch sensitive surface of the ear-cups 100 or the ear-buds 110. The ear-cups 100 and ear-buds 110 can automatically switch into the social mode. A memory associated with the ear-cups 100 and/or the ear-buds 110 can store an identifier associated with the user, such as a name of the user, e.g. "Sam." The externally facing microphone 260 can continually record ambient sounds. The processor 250 can analyze the recorded sound, upon detecting the word "Sam", the processor 250 can switch the ear-cups 100 and/or the ear-buds 110 into the social mode, where the ambient sound is passed through to the user. The processor 250 can be associated with the ear-cups 100, ear-buds 110, or can be a remote processor associated with a cell phone, a home device, an Internet server, etc.

The ear-cups 100 and ear-buds 110 can automatically detect when the user is speaking and record the user's voice. The internally facing microphone 280 of the ear-buds 110 does not pick up ambient sound because the microphone 280 is insulated by the ear-cups 100. For example, if a third person is talking next to the user, the microphone 280 is not going to receive a strong signal because the microphone is insulated by the ear-cups and is facing towards the user's ear canal.

The microphone 280 can record OAEs, as described in this application, and can record low frequencies of the user's speech that are transmitted through the skull and into the user's ear canal. When the microphone 280 detects low frequencies, the ear-bud 110 can determine that the user is speaking, and can send a signal to the externally facing microphone 260 to start recording the high frequencies of the user speech.

The electronic circuit 240 can obtain a sound recorded by the microphones 260, 280, and can combine the sound into a recording of the user's voice. The electronic circuit 240 can be a part of the ear-cups 100, or the ear-buds 110. The recording of the user's voice can be sent to a nearby device such as a cell phone, a home device, or the cellular modem 205 within the ear-cups. The device such as the cellular modem 205 can send the voice to the cellular network, thus enabling the user to use the ear-cups 100 and/or ear-buds 110 as a cell phone.

A processor 250, 235 can interpret the recording of the user's voice into a command and execute the command. The command can be a command to the headphones, or to other devices connected to the headphones such as cell phone, home device, an Internet server, etc. The command can state "play a song by Imagine Dragons." The ear-cups 100 and/or the ear-buds 110 can download the song and play the song to the user.

Figure 3:
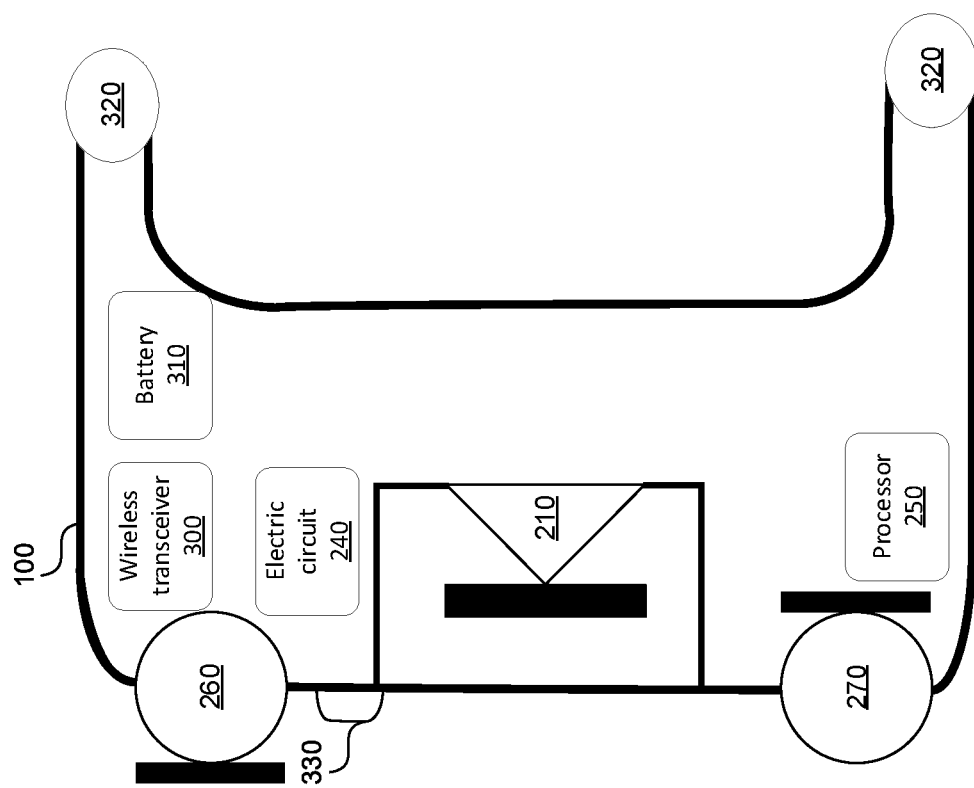
FIG. 3 shows a modular ear-cup, capable of operating without the ear-buds.

FIG. 3 shows a modular ear-cup 100, capable of operating without the ear-buds 110 in FIG. 1. The ear-cup 100 can personalize the audio based on the hearing profile of the user in several ways. The ear-cup 100 can retrieve OAE measurements made by the ear-buds 110 in FIG. 1 from a remote device such as a cell phone, an Internet server, a home device, etc. without the presence of ear-buds 110. Upon retrieving the OAE measurements, the ear-cup 100 can modify the audio to increase the user's enjoyment of the audio prior to playing the audio. The audio emitter 210 can emit the modified audio.

The wireless transceiver 300 can obtain the hearing profile from a server. The wireless transceiver 300 can be a cellular modem, a radio frequency transceiver, a Wi-Fi transceiver, etc. To operate the wireless transceiver 300, a battery 310 powering the wireless transceiver 300 needs to store enough power to operate the wireless transceiver 300. The longer the distance of communication, the more power the battery 310 needs to store. Due to the larger size, the ear-cup 100 can carry a bigger battery and store more power than the ear-bud 110 in FIG. 1.

The ear-cup 100 can include a sensor 320 placed into contact with a user's skin. The sensor 320 can measure a user's perception of the first sound, emitted by the audio emitter 210, by measuring a signal generated in response to the first sound. The sensor 320 can be placed continuously along the perimeter of the ear-cup, where the ear-cup is in contact with the skin, or, the sensor 320 can be placed at discrete locations along the perimeter of the ear-cup. The sensor 320 can be a dry electrode, a wet electrode, and/or a capacitor, which can measure auditory evoked potential response (AEP) generated in response to the first sound.

AEP is a type of EEG signal emanating from the brain through the scalp in response to an acoustical stimulus. The sensor 320 can measure any AEP, such as auditory brainstem response, mid latency response, cortical response, acoustic change complex, auditory steady state response, complex auditory brainstem response, electrocochleography, cochlear microphonic, or cochlear neurophonic AEP. The sensor 320 can also measure an acoustic reflex (also known as the stapedius reflex, middle-ear-muscles (MEM) reflex, attenuation reflex, or auditory reflex). The acoustic reflex is an involuntary muscle contraction that occurs in the middle ear in response to high-intensity sound stimuli or when the person starts to vocalize.

The hearing profile measured using the sensor 320 can be communicated to the ear-buds 110 in FIG. 1 wirelessly, from the ear-cup 100 to the ear-bud 110, or, can be communicated via an intermediary device such as a cell phone, a home device, a tablet, a smart watch, an Internet server, etc.

In addition to or instead of modifying the music based on the hearing profile of the user, the ear-cup 100 can modify the music based on the acoustic profile of the audio emitter 210. The ear-cup 100 can obtain an acoustic profile of the audio emitter and can modify the audio based on the acoustic profile of the audio emitter and acoustic properties of the ear-cup 100 prior to playing the audio to the user.

The acoustic profile of the audio emitter can correlate a frequency and/or an amplitude received by the audio emitter 210 and a frequency and/or an amplitude emitted by the audio emitter 210. For example, the audio emitter 210 can receive a frequency of 32 Hz at 10 dB, but the audio emitter can emit that frequency as 32 kHz at 8 dB. Based on the acoustic profile of the audio emitter 210, the ear-cup 100 can modify audio prior to sending the audio to the audio emitter 210, so that the emitted audio matches the audio intended to be emitted by the audio emitter.

The ear-cup 100 can obtain the acoustic profile from the audio emitter 210, can download the acoustic profile of the audio emitter 210 from the Internet, or can measure the acoustic profile of the audio emitter 210 and/or the acoustic profile of the cavity of the ear-cup 100. To measure the acoustic profile, the processor 250 can send audio to the audio emitter 210 and can determine a frequency and an amplitude contained in the audio. The audio emitter 210 can play the audio, while the internally facing microphone 270 records the emitted audio and sends the recorded audio to the processor 250. The processor 250 can create the acoustic profile of the audio emitter 210 based on the determined frequency and amplitude contained in the audio, and the emitted frequency and amplitude. Additionally, the acoustic profile of the microphone can be taken into account in determining the acoustic profile of the audio emitter 210.

The user can communicate with the ear-cups 100 using voice. The user can press a button 330 to put the ear-cups 100 in a command state, meaning that the ear-cups 100 are ready to receive an input from the user. The input from the user can be a voice command, recorded by the externally facing microphone 260, such as "play a Beatles song." The ear-cup 100 can interpret the command locally or can send the recorded voice to a remote processor associated with a cell phone, home device, a tablet, an Internet server, etc. to interpret the command. Upon interpreting the command, the transceiver 300, which can be a cellular modem or a Wi-Fi transceiver, can access the cellular network or the Internet, download "Hey Jude", and play the song to the user. The ear-cup 100 can download the data from the Internet and/or from the cellular network without relying on a cell phone for communication. The downloaded song can be modified prior to playing to account for the hearing profile of the user and/or the acoustic profile of the audio emitter 210.

Figure 4:
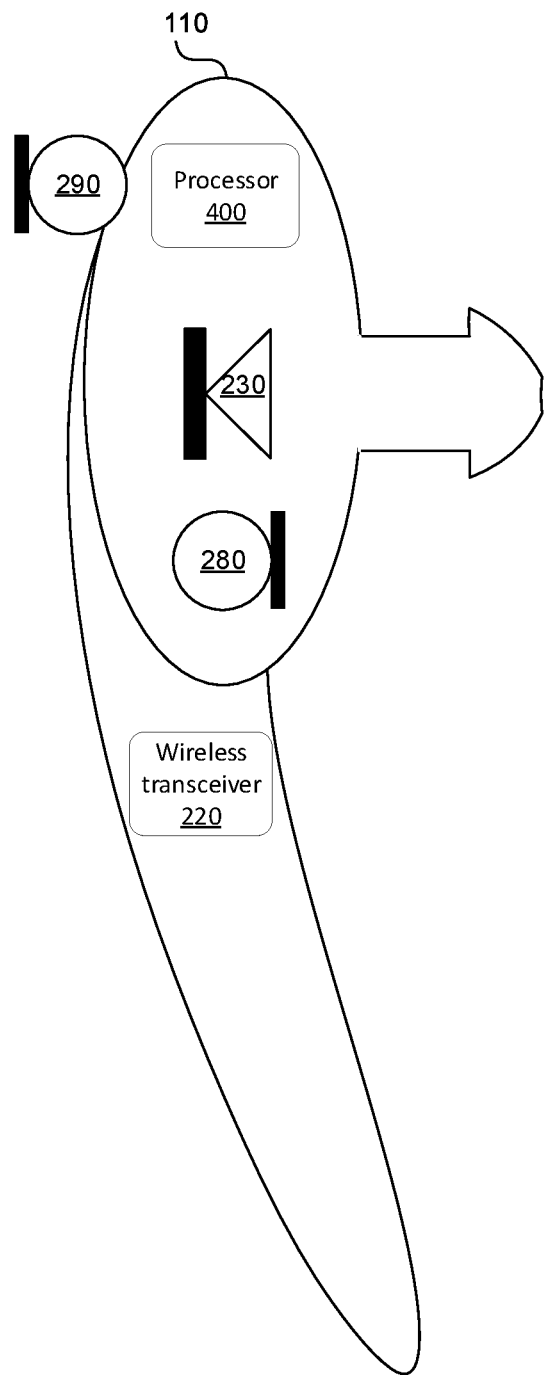
FIG. 4 shows a modular ear-bud, capable of operating without the ear-cups.

FIG. 4 shows a modular ear-bud 110, capable of operating without the ear-cups 100 in FIG. 1. The ear-buds 110 can obtain a hearing profile associated with the user. The ear-buds 110 can measure the hearing profile, as described in this application, or the ear-buds 110 can download the hearing profile measured by the ear-cup 100 in FIG. 1, or by the ear-buds 110 at an earlier time. The hearing profile can be downloaded from a remote device such as a cell phone, a home device, a tablet, an Internet server, etc. using the wireless transceiver 220. A processor 400 associated with the ear-cup 100 can modify the audio prior to playing the audio to the audio emitter 230.

The wireless transceiver 220 can download the hearing profile. The wireless transceiver 220 can be a cellular modem enabling the ear-bud 110 to communicate via cellular networks without the aid of another device such as the cell phone, tablet, home device, etc.

In addition to modifying the audio based on the hearing profile of the user, the processor 400 can modify the audio based on the acoustic profile of the audio emitter 230. The processor 400 can obtain an acoustic profile of the audio emitter 230 playing the modified audio from the audio emitter 230, from a remote computer, such as a cell phone, a home device, a tablet, an Internet server, or the processor 400 can measure the acoustic profile of the audio emitter 230.

To measure the acoustic profile of the audio emitter 230, the processor 400 can send audio to the audio emitter 230 containing a frequency of 15 KHz at 5 dB, but the audio emitter can emit that frequency as 15 kHz at 8 dB. In another example, the audio emitter 230 can receive a frequency of 18 KHz at 9 dB but emit that frequency as 18 KHz at 13 dB. Based on the acoustic profile of the audio emitter 230, the processor 400 can modify audio prior to sending the audio to the audio emitter 230, so that the emitted audio matches the audio sent to the audio emitter.

The ear-bud 110 can detect when the ear-cup 100 in FIG. 1 is proximate to the ear-bud 110. For example, the wireless transceiver 200 in FIG. 2 of the ear-cup 100 in FIG. 2 can periodically send a short distance signal, which when received by the wireless transceiver 220 indicates to the ear-bud 110 that the ear-cup is close. Once the ear-cup 100 has been detected, the processor 250 in FIG. 2 and/or processor 400, can switch the audio processing to account for the two audio emitters 210 in FIG. 2, and 230. For example, the processor 250, 400, can separate audio into a first audio including low frequencies, and a second audio including mid and high frequencies. The processor 250, 400, can send the low frequencies to the audio emitter 210 associated with the ear-cup 100, and the mid and high frequencies to the audio emitter 230 associated with the ear-bud 110. The communication between the ear-cup 100 and ear-bud 110 can occur through the wireless transceivers 200, 220.

Figure 5C:
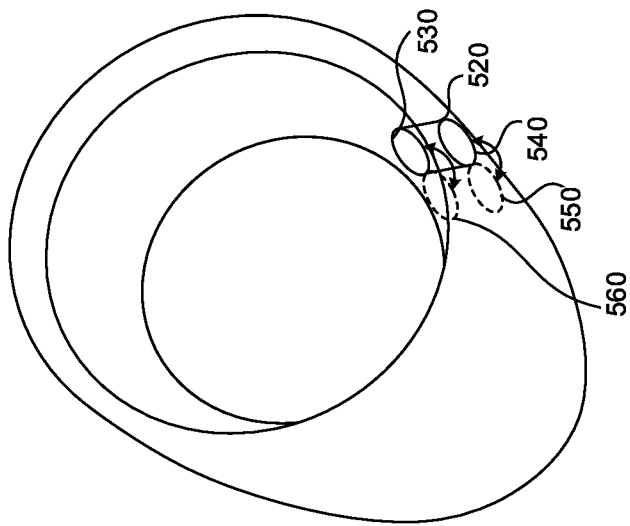
FIGS. 5A-5C show various arrangements of an ear-cup and an ear-bud.
Figure 5B:
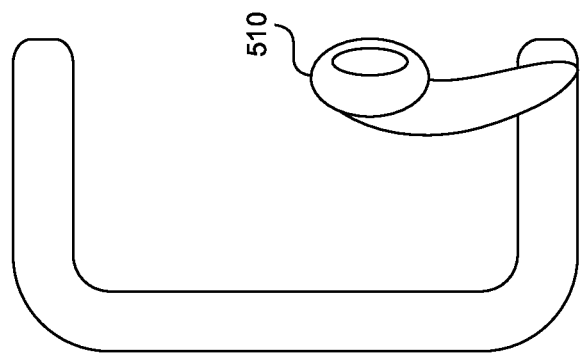
Figure 5A:
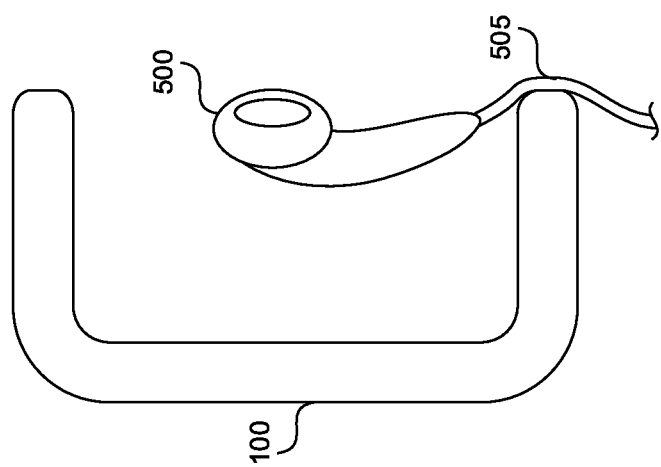

FIGS. 5A-5C show various arrangements of an ear-cup and an ear-bud. The standalone ear-cup and standalone ear-bud described, for example, in FIGS. 3-4, respectively, can be combined into a single system as shown, for example, in FIGS. 1-2, 5A-5C.

The ear-bud 110 in FIG. 1 can be a wired ear-bud 500, as shown in FIG. 5A. The wired ear-bud 500 can be surrounded by the ear-cup 100, with the wire 505 positioned between the surface of the ear-cup 100 and a user's skin.

The ear-bud 110 can be a wireless ear-bud 510 as shown in FIG. 5B and can fit through a closable passage 520 in FIG. 5C. The closable passage 520 can have two trapdoors 530, 540, mounted on two opposing surfaces of the ear-cup 100. The trapdoors 530, 540, are normally closed, but when the wireless ear-bud 510 pushes against the trapdoor 530, 540, the trapdoors can open, and assume positions 550, 560, to allow the passage of the ear-bud 510. When the wireless ear-bud 510 is removed, the trapdoors 530, 540, can automatically snap back into their original position, closing the passage 520. A mechanism to automatically snap back the trapdoors 530, 540, can include a spring or a magnet pulling the trapdoors 530, 540, into their closed position.

Figure 6A:
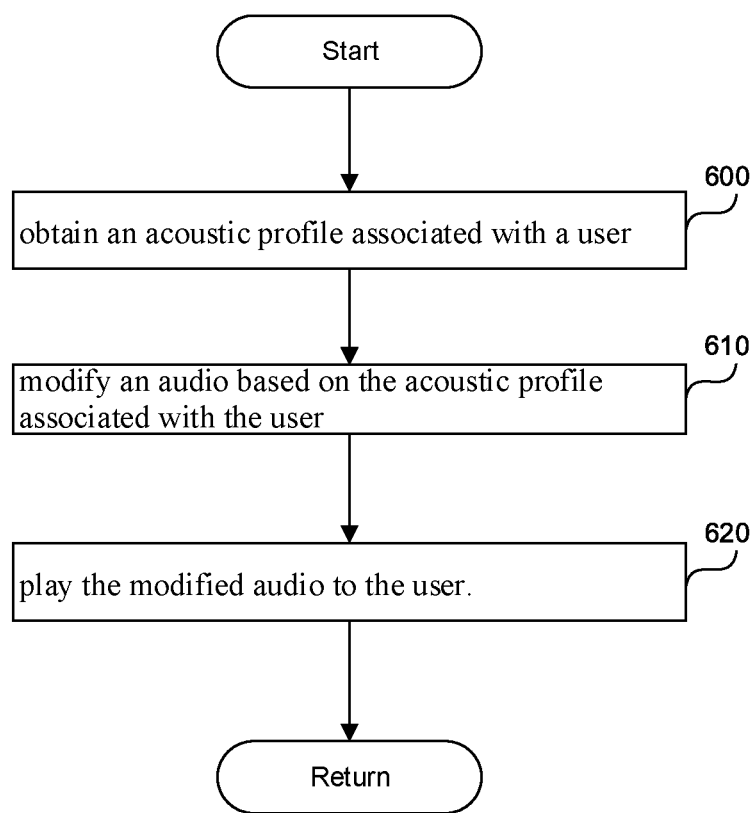
FIG. 6A is a flowchart of a method to personalize an audio played to user.

FIG. 6A is a flowchart of a method to personalize audio played to user. In step 600, an audio emitter associated with an ear-cup or an ear-bud can obtain a hearing profile associated with a user. The hearing profile can indicate a correlation between a received amplitude and frequency and a perceived amplitude and frequency. The hearing profile can be stored in a memory associated with the audio emitter such as a memory of the ear-cup or the ear-bud, the hearing profile can be received from an Internet server, a nearby device such as a cell phone, a tablet, home device, a wearable device, etc.

In step 610, a processor associated with the audio emitter can modify audio based on the hearing profile associated with the user to equalize the received amplitude and frequency and the perceived amplitude and frequency. In step 620, the audio emitter can play the modified audio to the user.

To obtain the hearing profile, the processor can measure an otoacoustic emission generated in the user's cochlea in response to the received amplitude and frequency. The processor can create the hearing profile based on the measured otoacoustic emission. For example, the user's ear can receive a frequency of 5 kHz at 18 dB, but the otoacoustic emissions can indicate that the user's ear perceives that frequency as 5 kHz at 12 dB. Based on the hearing profile, the audio emitter 230 can modify an audio prior to emitting the audio to the user, so that the user perceives the audio at the desired frequency and/or amplitude. The measurement of the hearing profile is further described in reference to FIG. 6B below.

In addition to compensating for the hearing profile of the user, the processor can compensate for the acoustic profile of the audio emitter. The processor can obtain an acoustic profile of an audio emitter playing the modified audio. The acoustic profile of the audio emitter can correlate an amplitude and a frequency received by the audio emitter and an amplitude and a frequency emitted by the audio emitter. The acoustic profile of the audio emitter can be obtained from a memory associated with the audio emitter, from a remote computer such as downloaded from the Internet based on make and model of the audio emitter, and/or it can be measured, etc. The processor can modify the audio based on the acoustic profile of the audio emitter prior to playing the audio to the user.

To measure the acoustic profile of the audio emitter, the processor can determine a frequency and an amplitude of audio to be emitted by the audio emitter. For example, the processor can determine that an audio contains a frequency of 23 Hz at 7.5 dB. The processor can measure a frequency and an amplitude of the audio emitted by the audio emitter. For example, when the audio emitter emits the audio containing the frequency of 23 Hz and 7.5 dB, the processor using a microphone can measure the frequency and amplitude of the emitted audio, which can be 23.5 Hz at 6.7 dB. To create the acoustic profile of the audio emitter, the processor can record in the acoustic profile that the audio emitter emits at the frequency of 23 Hz and 7.5 dB as a frequency of 25 Hz at 6.7 dB.

The processor can detect a proximity between two audio emitters, first audio emitter, and a second audio emitter. For example, the ear-cup can detect a proximity of the ear-bud, or the ear-bud can detect proximity of the ear-cup, and the processor can switch into a dual emitter processing mode to account for the 2 audio emitters. For example, the processor can separate audio intended for a first audio emitter into at least a first audio and a second audio and can send the first audio to the first audio emitter and the second audio to the second audio emitter. The first audio can contain the low frequencies, or the second audio can contain mid and high frequencies, and vice versa.

To detect the proximity of the second audio emitter, a wireless transmitter associated with the first audio emitter can periodically emit a short-range message formatted according to a predetermined protocol, which identifies the second audio emitter. When a wireless transceiver associated with the first audio emitter receives the message, the wireless transceiver can identify the second audio emitter, and can indicate to the processor to switch into a dual emitter mode.

To detect the proximity of the second audio emitter, in another embodiment, a range finder can be associated with the first audio emitter. The rangefinder can be a laser, radar, sonar, lidar and/or ultrasonic range finder, capacitive, inductive, RF, optical, magnetic or acoustic sensor. Once a second proximate object is detected, the processor can switch into the dual emitter mode.

The processor can detect when the user is speaking and take appropriate action, such as record the user's voice, transmit the user's voice over a cellular network to enable user to make a phone call, interpret the user's voice as a command, etc. Using the first sensor placed proximate to a user's head, the processor can detect a low-frequency audio. For example, the sensor can be a microphone placed at or within the user's ear canal. The so placed microphone can detect low frequencies of the user's voice transmitted through the skull and into the ear canal.

Upon detecting the low-frequency audio, the processor can send the signal to a second sensor to record a high-frequency audio. The second sensor can be an externally facing microphone that can record high to mid-frequencies of the user's speech. The processor can record the low-frequency audio and the high-frequency audio. The recorded audio can be transmitted over the cellular network as a phone call made without a phone, using only the ear-buds and/or ear-cups, or the recorded audio can be transmitted over the cellular network to be interpreted. The recorded audio can also be stored for later use or interpreted locally as a command to the ear-buds and/or ear-cups.

The processor can record an ambient sound surrounding an ear-cup. The processor can perform filtering of the ambient sound to obtain a filtered sound. The processor can wirelessly transmit the ambient sound or the filtered sound to an ear-bud. The processor can play the filtered sound through an audio emitter associated with an ear-bud.

The filtering can create the filtered sound to destructively interfere with the ambient sound. When such filtered sound is played through the audio emitter, the filtered sound destructively interferes with the ambient sound, thus causing ambient noise cancellation within the ear-bud.

The filtering can also happen upon receiving an input requesting transmission of the ambient sound to the ear-bud. In that case, the ambient sound can be adjusted to enhance the perception of the ambient sound to obtain the filtered sound. The adjustment can come from filtering out the noise in the ambient sound, such as frequencies outside of the human speech frequency. The adjustment can also come from modifying the ambient sound based on the hearing profile of the user to enhance the perception of the ambient sound. The input requesting transmission is described in this application, such as a touch of a button or a touch on the surface of the ear-cup, or detecting an audio addressed to the user such as an audio containing the name of the user.

Figure 6B:
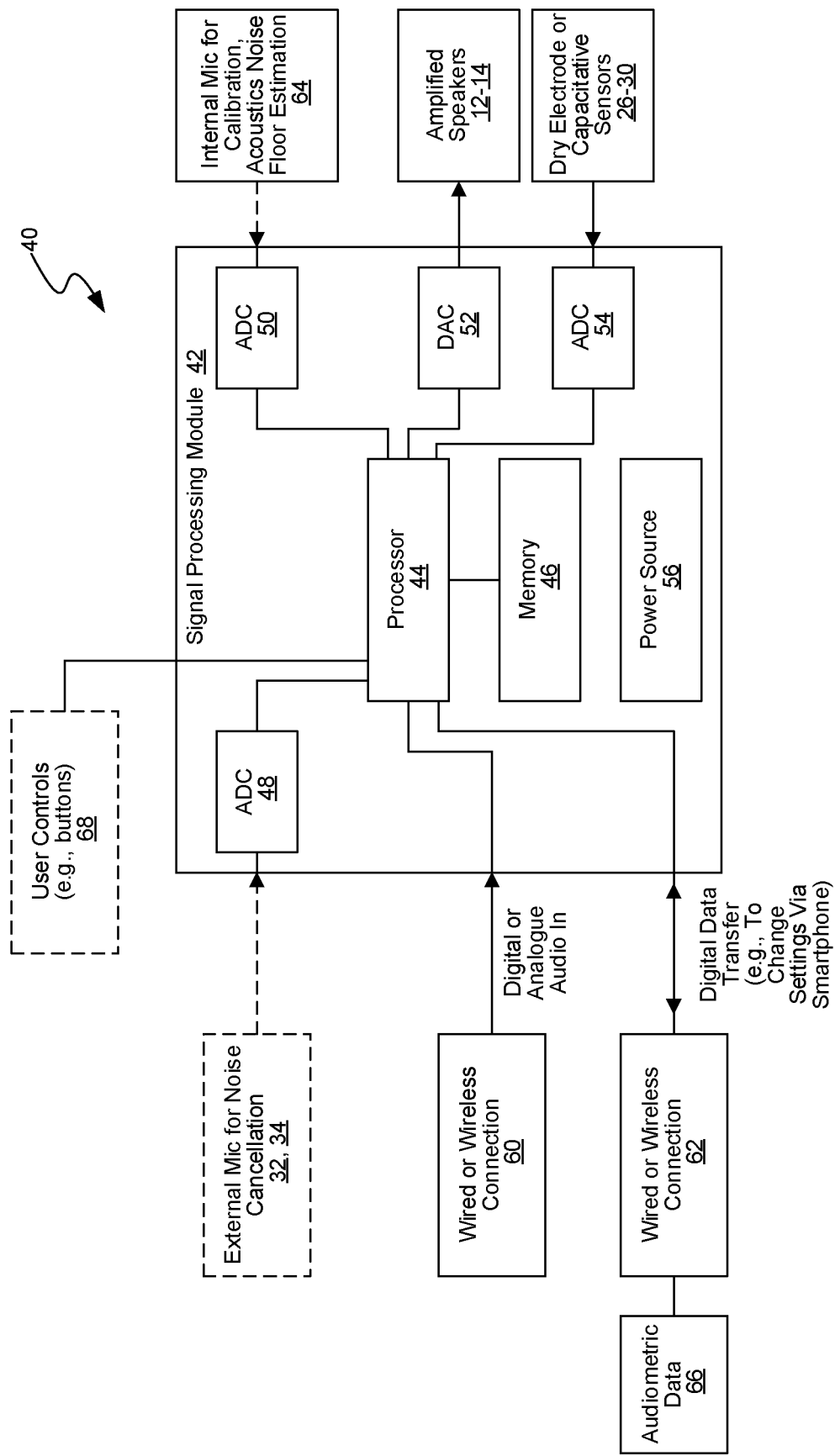
FIG. 6B is a schematic diagram depicting the electrical components of the signal processing module that can be located with an ear-cup and/or an ear-bud and that can be used in creating a hearing profile of a user. The hearing profile can be created based on otoacoustic emissions.

FIG. 6B is a schematic diagram depicting the electrical components of the signal processing module that can be located with an ear-cup and/or an ear-bud and that can be used in creating a hearing profile of a user. The hearing profile can be created based on otoacoustic emissions.

Otoacoustic emissions can be measured within the user's ear canal and then used to determine thresholds at multiple frequencies or relative amplitudes of the otoacoustic emissions at multiple frequencies to one or more suprathreshold sound levels in order to develop the frequency dependent hearing transfer function of the user's ear(s). Stimulus frequency OAE, swept-tone OAE, transient evoked OAE, DP-OAE, or pulsed DP-OAE can be used for this purpose.

The amplitude, latency, hearing threshold, and/or phase of the measured OAEs can be compared to response ranges from normal-hearing and hearing-impaired listeners to develop the frequency dependent hearing transfer function for each ear of the user.

Since DP-OAEs are best measured in a sealed ear canal with two separate speakers/receivers packed into each ear canal, the use of OAEs is best suited for the ear-bud implementation.

In the case of OAEs, one stimulus frequency/loudness combination yields a response amplitude. The measurement of multiple frequencies in this manner yields a plot of response amplitude versus frequency, which is stored in the memory 46 of the signal processing modules 42, or can be stored in a remote database. Many OAE techniques rely upon the measurement of one frequency per stimulus; however, the swept tone OAE measures all frequencies in the range of the sweep. Nevertheless, the hearing transfer function remains the same regardless of the measuring method used, that is, the hearing transfer function comprises a plot of the signal amplitude versus frequency of the OAE evoked in the user's ear upon application of an input audio signal. The hearing transfer function can also comprise the input amplitude associated with the input frequency.

In this exemplary embodiment, in order to determine the hearing transfer function for a user's ear, the processor 44 captures data points for an input audio signal comprising a number of frequencies, for example, 500, 1000, 2000 and 4000 Hz, which are typically the same frequencies used in the equalizer that acts upon the output sound signal to the loudspeakers 12 and 14. At any one frequency, the processor measures the response to an input audio signal at reducing levels, for example, at 70 dB, 60 dB, 50 dB, 40 dB, etc., until there is no longer a measurable response. The processor 44 records the data point at that time. It will be appreciated that in other embodiments, different methods, such as curve fitting or measuring a profile at a single loudness level, can be used to determine the hearing transfer function. The input audio signal can include a test audio signal, and/or a content audio signal comprising music, speech, environment sounds, animal sounds, etc. For example, the input audio signal can include the content audio signal with an embedded test audio signal.

In-situ calibration of the speakers to the user's ear canal can be performed by the processor 44 prior to making an OAE measurement. In this context "in-situ" refers to measurements made at times when the speakers and microphone are situated for use inside the ear canal. Where the acoustic characteristic of the speakers are known, the acoustic impedance of the ear can be calculated from this data and utilized for deriving corrections.

In one or more embodiments, in-situ calibration can be done by playing a test audio signal, such as a chirp, or the content signal, covering the frequency range of the speakers, recording the frequency response with the microphone, and adjusting output by changing the equalizer settings to make a flat frequency response of the desired loudness.

In other embodiments, this calibration can be done in real time to any playback sound (e.g., music, or any audio comprising content) by constantly comparing the predicted output of the speakers in the frequency domain given the electric input to the speaker to the microphone and altering the equalizer gains until they match. The in-situ calibration accounts for variations in different users' external portion of the ear and variations in the placement of earbuds. If no audiometric data is yet available, then the in-situ calibration alone can be used for adjusting the sound.

Any variation with an internal microphone can use that microphone for in-situ calibration of the speakers performed every time the user places the headphones on.

Power Management of the Modular Ear-Cups and Ear-Buds

Figure 7:
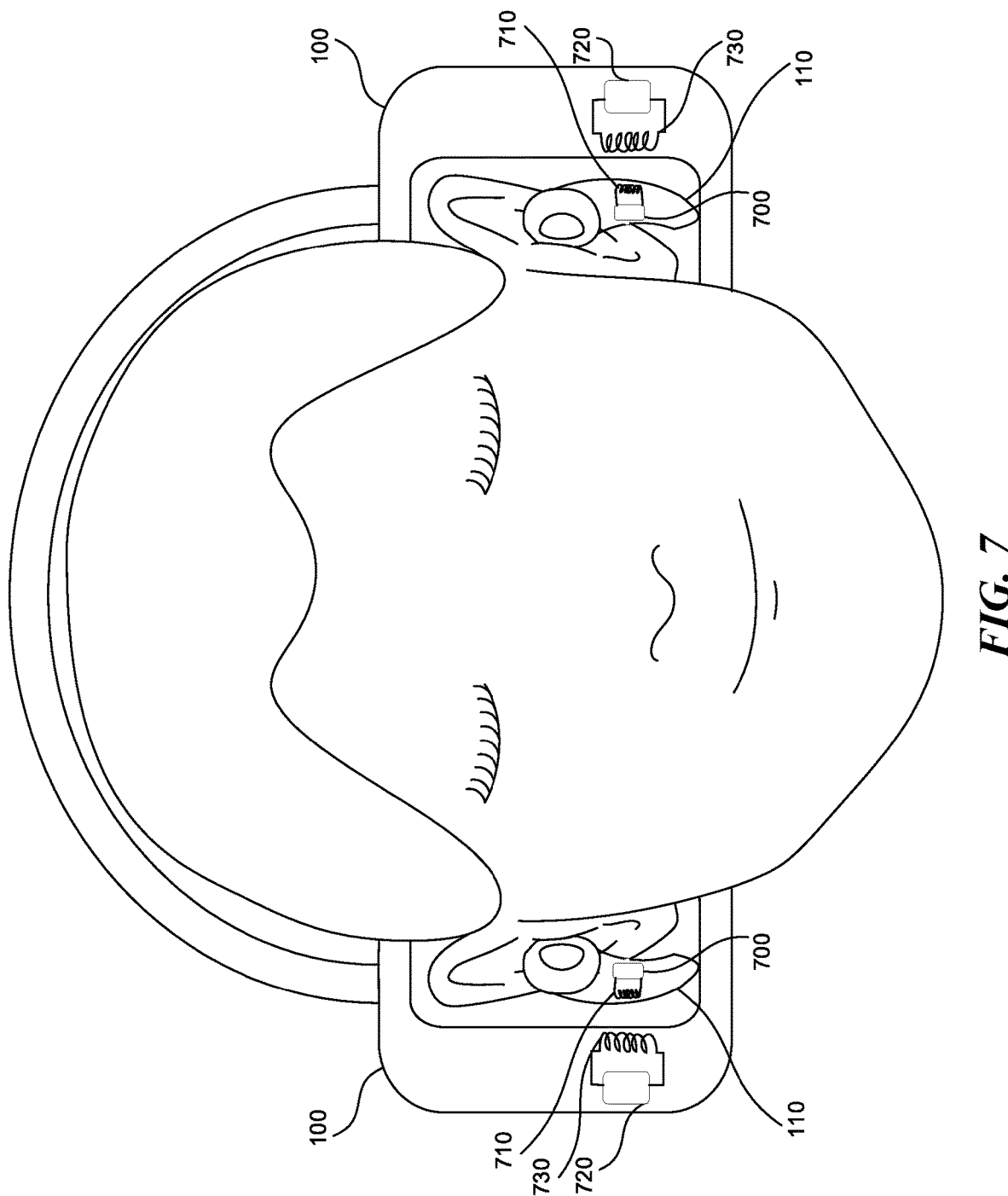
FIG. 7 shows a power source associated with modular ear-cups and ear-buds in communication with each other.

FIG. 7 shows a power source associated with modular ear-cups and ear-buds in communication with each other. An ear-bud 110 can receive a first audio and can emit the first audio. The ear-bud 110 can include a power source 700, such as a battery, having a power capacity less than the power needed for a potentially desired usage of the wireless ear-bud. Due to the small size necessary to fit within the ear, the ear-bud 110 cannot accommodate a large battery necessary to power the ear-bud for more than several hours of use. The user may want to use the ear-bud continuously for more than several hours, thus draining the battery 700. The battery 700 can be wirelessly charged using wireless power transfer, such as an induction coil 710 within the ear-bud 110. The ear-bud 110 can be wireless or can be wired.

In another embodiment, the power source 700 of the ear-bud 110 can include a transient power storage, such as capacitors holding the voltage transiently. The power source 700 of the ear-bud 110 can be powered by the power source 720 of the ear-cup 100. In some embodiments, the transient power source can discharge after a certain amount of time, such as several hours or several days. When the transient power source is discharged, the earbud 110 cannot operate without being charged by another external power source. The power source 700 can be charged in a wired or a wireless manner by the external power source such as the power source 720 of the ear-cup 100, a wired device plugged into power, or via wearable device such as a necklace, an earring, glasses, a headband, etc.

An ear-cup 100 can have at least two functions, where one function is wirelessly charging the power source 700 of the ear-bud 110, and the other function is playing an audio to a user. The ear-cup 100 can substantially surround the wireless ear-bud 110. For example, the ear-bud 110 can be fully contained within the cavity of the ear-cup 100 as shown in FIG. 1, or the ear-bud 110 can partially protrude from the ear-cup 100 as shown in FIG. 5B. The ear-cup 100 can include a power source 720 to wirelessly transfer power to the power source 700 while the wireless ear-bud 110 is operating. By wirelessly transferring power, the ear-cup 100 can enable the battery 700 to provide the power needed for the potentially desired usage of the wireless ear-bud. In other words, by continually charging the power source 700, the ear-bud 110 can continually play music to the user even after several hours, when the power source 700 would have been drained if the power source 700 weren't charged.

The power source 720 can be connected to an induction coil 730, which can induce a current in the induction coil 710 of the ear-bud 110. The power source 720 within the ear-cup can also be charged wirelessly by a wired device plugged into power, or via wearable device such as a necklace, an earring, glasses, a headband, etc. The power source 720 can be a battery, or can be a transient power source, such as a capacitor, that can be charged in a wired or wireless manner by an external device.

Figure 8:
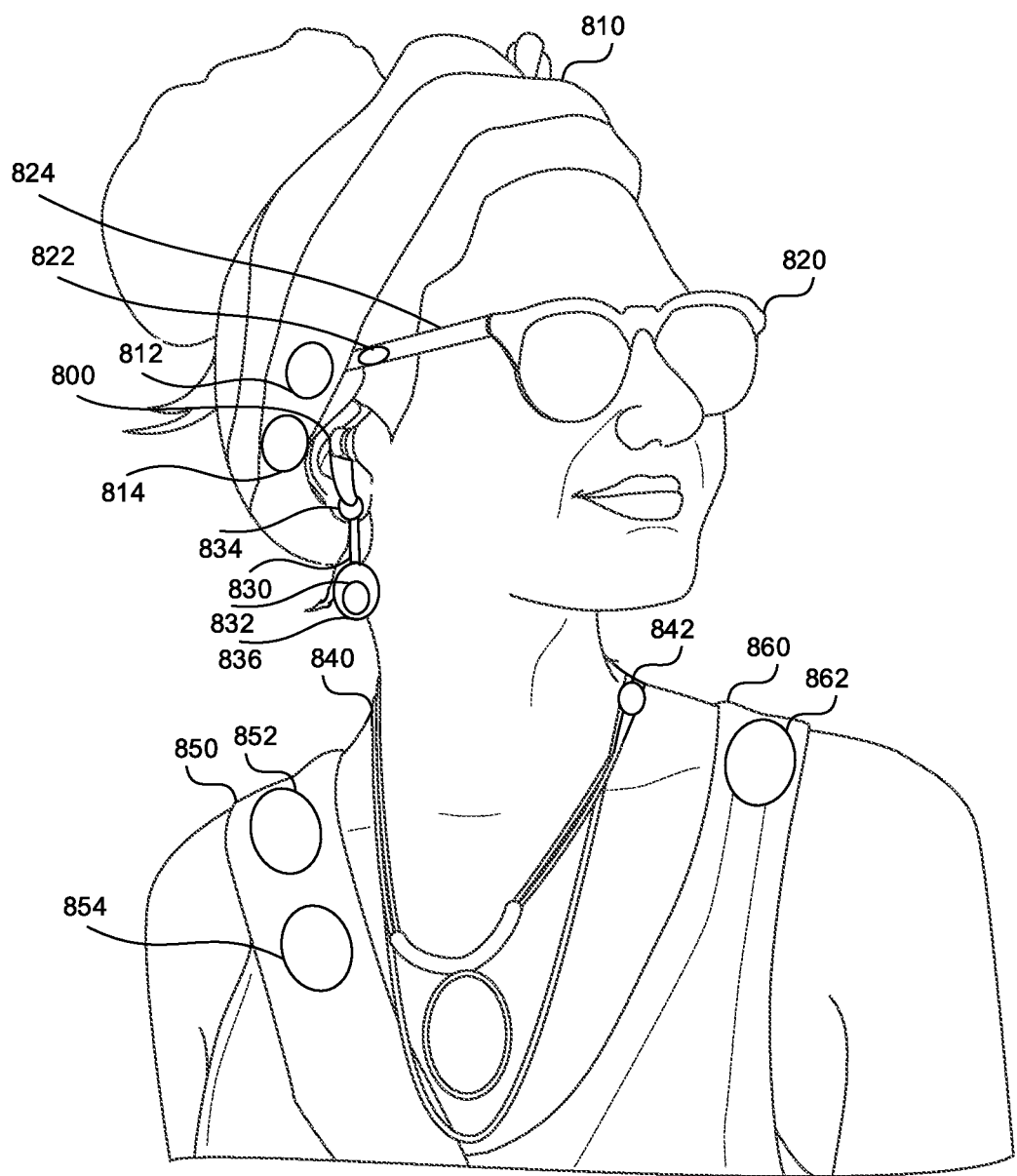
FIG. 8 shows a dual function member according to various embodiments.

FIG. 8 shows a dual function member according to various embodiments. A device 800 can have a power capacity less than the power needed for a potentially desired usage of the device 800. The device 800 can be wired, or wireless, such as a wireless ear-bud.

A dual function member 810, 820, 830, 840, 850, 860, can include a power source configured to wirelessly transfer power to the device 800 while the device 800 is consuming power, thus enabling the device 800 to operate for a duration of the potentially desired usage. The wireless power transfer can include an induction coil 710, 730 in FIG. 7. The device 800 can be a wireless ear-bud carrying a small battery that can only play audio for 3 or 4 hours continuously.

The dual function member 810, 820, 830, 840, 850, 860, can be a wearable accessory such as an ear-cup 100 in FIG. 7, a headband 810, glasses 820, an earring 830, a necklace 840, a purse strap 850, clothing 860, etc. A first function of the dual function member 810, 820, 830, 840, 850, 860, can be to wirelessly transfer power to the device 800. A second function of the dual function member 810, 820, 830, 840, 850, 860, is different from the first function, and can include the decorative function such as in the case of the earring 830, the necklace 840, or the headband 810. The second function can include holding a purse, a water bottle, a backpack, etc. as in the case of the purse strap 850. The second function can include holding the hair back as in the case of headband 810, a hair clip, a hair tie, etc. The second function can also include clothing such as in the case of the tank top 860.

The dual function member 810, 820, 830, 840, 850, 860, can include one or more power sources. For example, the headband 810 can have multiple discrete wireless power transmitters 812, 814 placed along the perimeter of the headband 810, or the headband can have one continuous wireless power transmitter, such as an induction coil, circumventing the perimeter of the headband 810. The glasses 820 can have wireless power transmitters 822 positioned in the side arm 824 of the glasses 820 or can have one continuous wireless power transmitter placed through the frame of the glasses 820. The earring 830 can have a wireless power transmitter 832 positioned within the ear clasp 834, or within the hanging part 836 of the earring 830. The earring 830 can also have one continuous wireless power transmitter running through the earring 830.

The necklace 840 can have multiple discrete wireless power transmitters 842 placed along the perimeter of the necklace 840, or the necklace can have one continuous wireless power transmitter, such as an induction coil, circumventing the perimeter of the necklace 840. The strap 850 can also have multiple discrete wire power transmitters 852, 854, placed along the perimeter of the strap 850, or the strap 850 can have one continuous wireless power transmitter placed through the strap 850. Finally, the clothing 860 can have multiple discrete wireless power transmitter 862 located in the region expected to cover the wearer's shoulders.

The dual function member 810, 820, 830, 840, 850, 860, can also be charged wirelessly from a third power source. The device 800, the dual function member 810, 820, 830, 840, 850, 860, and the third power source can create a daisy chain of wireless power transmission. The third power source can receive power wirelessly or can receive power through a wire connected to a power source.

Figure 9A:
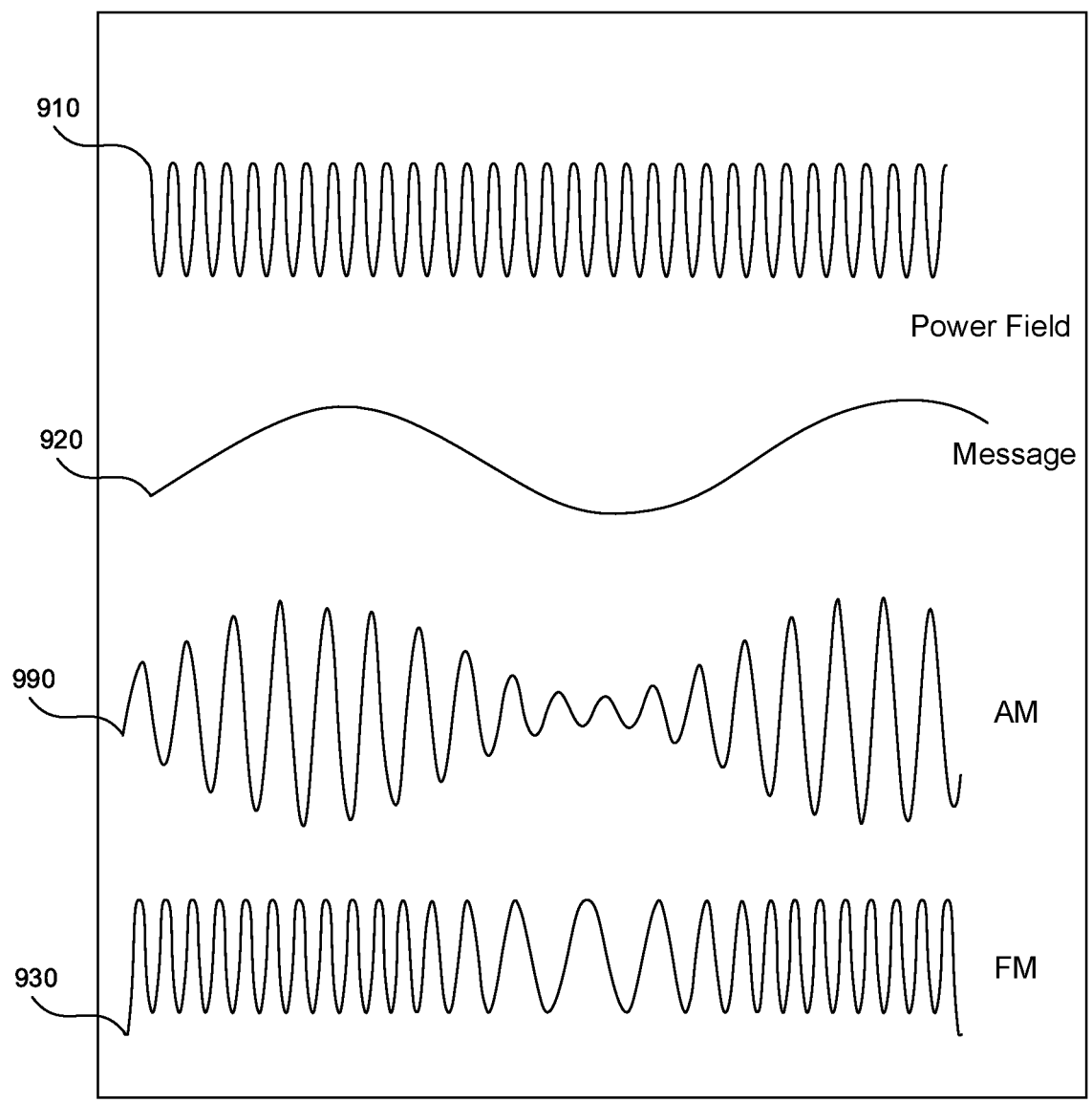
FIGS. 9A-9B show an encoding member to perform amplitude modulation and frequency modulation of a power field.
Figure 9B:
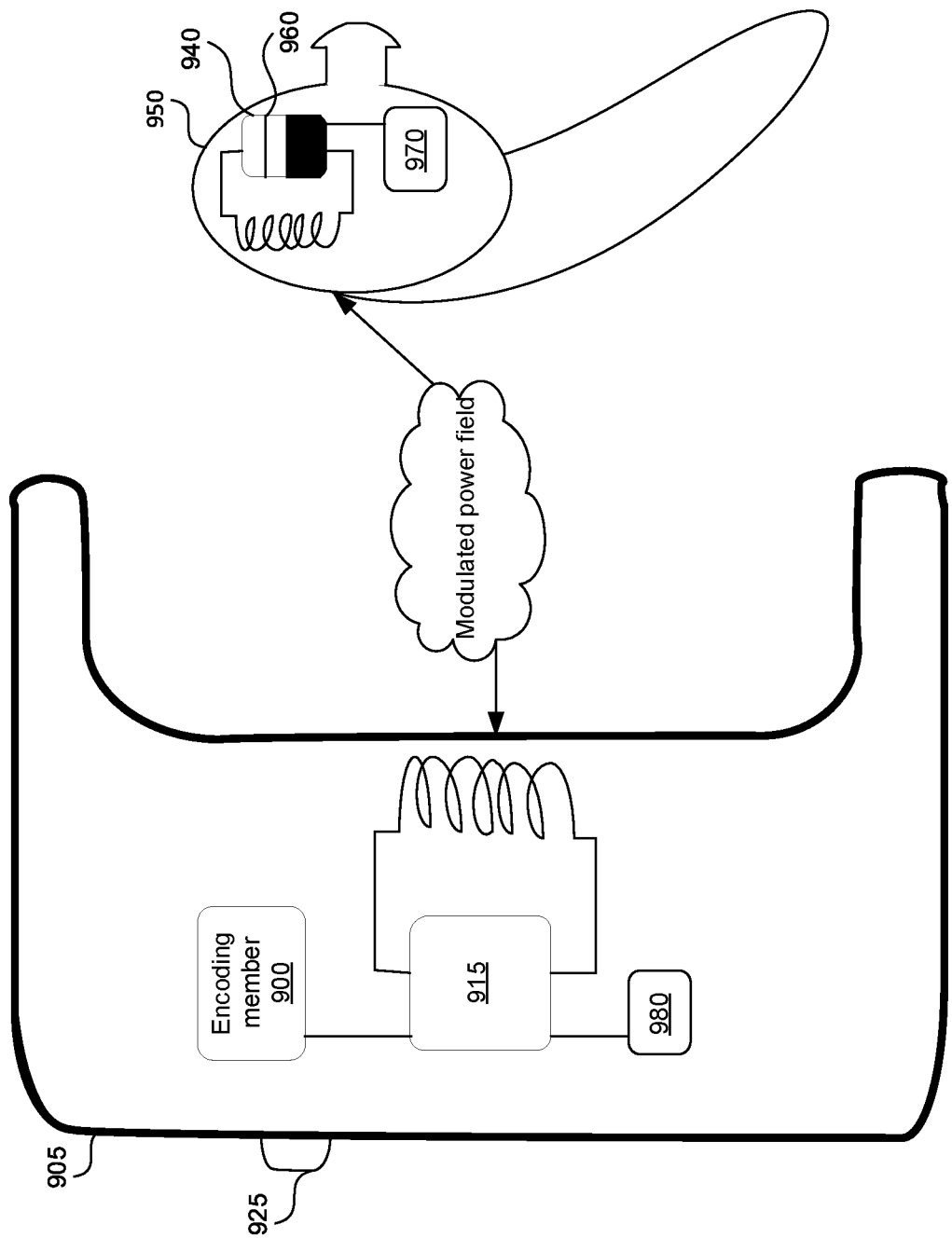

FIGS. 9A-9B show an encoding member to perform amplitude modulation and frequency modulation of a power field. The power source 915 can wirelessly transmit the power along with data such as audio, or a command to the device 950. To transmit the data along with the power, the encoding member 900 in FIG. 9B of the dual function member 905 can modify the frequency and/or amplitude of the power field 910, i.e., electromagnetic field, produced by the power source 915. The encoding member 900 can be a processor, while the dual function member 905 can be an ear-cup, or any other dual function member 810, 820, 830, 840, 850, 860 in FIG. 8. The device 950 can be a wireless ear-bud, wired ear-bud, a hearing aid, etc. The device 950 can be waterproof.

The encoding member 900 can modify the amplitude of the power field 910, to encode the message 920. The resulting amplitude modulated power field appears as an amplitude modulated power field 990. The amplitude modulated power field 990 can wirelessly transfer power to the power source 940 of the device 950. In addition, the amplitude modulated power field 990 can transmit the message 920 to the device 950.

The encoding member 900 can modify the frequency of the power field 910, to encode the message 920. The resulting frequency modulated power field appears as a frequency modulated power field 930. The frequency modulated power field 930 can wirelessly transfer power to the power source 940 of the device 950. In addition, the frequency modulated power field 930 can transmit the message 920 to the device 950. Similarly, the encoding member 900 can perform phase modulation to transmit the message 920. The device 950 can be wired or wireless, such as an ear-bud.

The message 920 can include data such as audio, or a command to the device 950. For example, an instruction to the dual function member 810, 820, 830, 840, 850, 860 in FIG. 8, can be transmitted using the power field to the device 950. The instruction can be a press of a button associated with the dual function member 810, 820, 830, 840, 850, 860. In a more specific example, a press of the button 925 can be transmitted to the device 950. The press of the button 925 can notify the device 950 to receive a command from the user, or can put device 950 in social mode, i.e., notify the device to reduce the amplitude of the audio, or to completely stop emitting the audio and to allow ambient sound to reach the user.

The device 950 can monitor an amount 945 of power associated with the power source 940 of the device 950. When an amount 945 of power of the power source 940 is below a predefined threshold 960, the wireless audio device can activate the power source of the dual function member 905. The predefined threshold 960 can be, for example, 60% of the total amount of power associated with a power source 940. The wireless audio device can be a wearable audio device, such as a headphone, an ear-bud, an ear-cup, a hearing aid, etc.

To activate the power source of the dual function member 905, a wireless transceiver 970 can send the request to a wireless transceiver 980 of the dual function member 905, to request more power. The dual function member 905 can respond in several ways. The dual function member can activate the power source 915 and transfer power to the power source 940, or the dual function member can determine the most power intensive task associated with the power source 940, and move that task to another device, such as a left ear-bud, a right ear-bud, a left ear-cup or a right ear-cup, as explained further in this application.

The dual function member 905, upon receiving a request to activate the power source from the device 950, can choose the power source among multiple power sources based on a distance to the device 950 and/or based on an amount of power contained within the power source among the multiple power sources, as explained further below.

Figure 10:
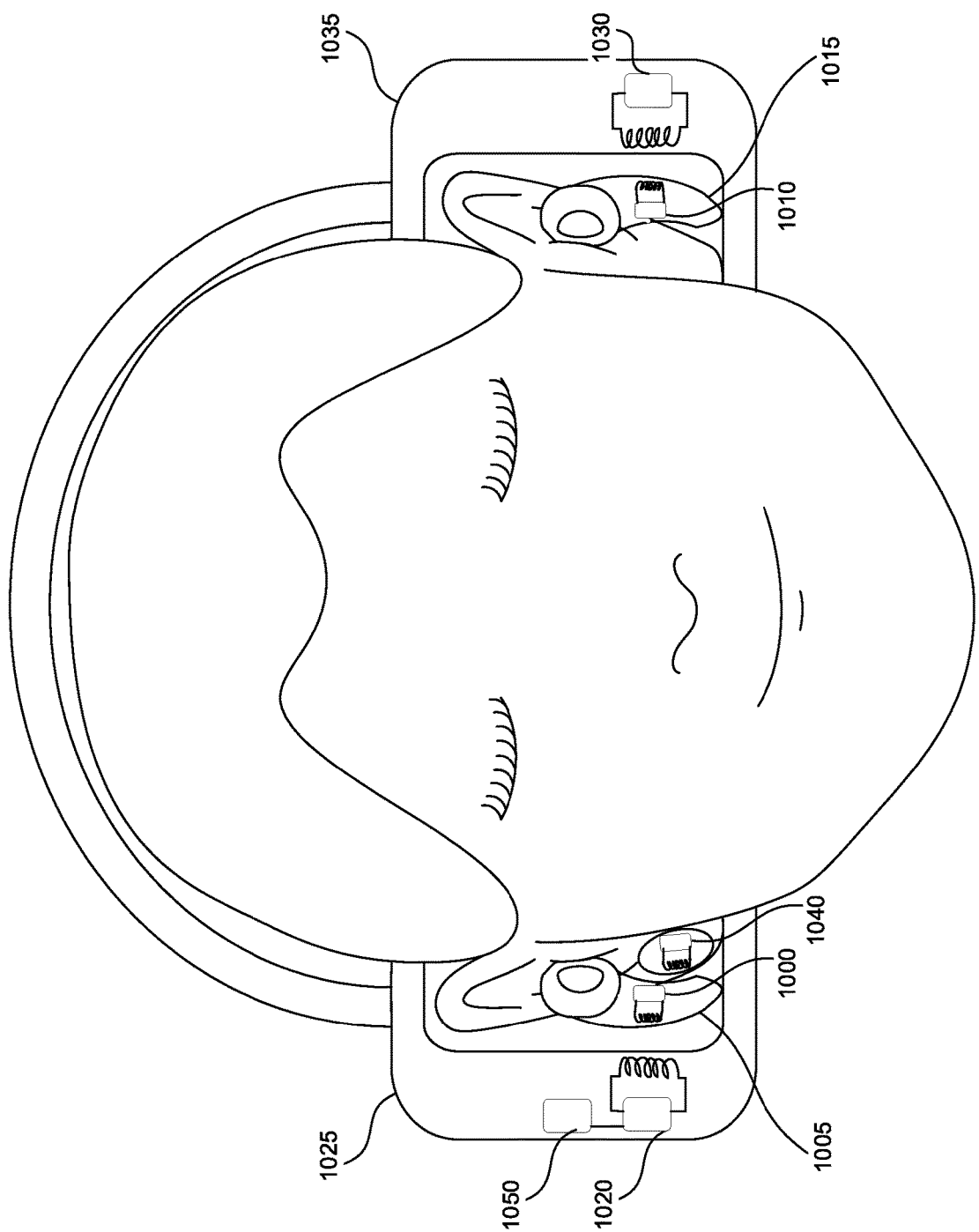
FIG. 10 shows a system to optimize power consumption between multiple components.

FIG. 10 shows a system to optimize power consumption between multiple components. The system can include multiple power sources 1000, 1010, 1020, 1030, 1040. Power sources 1000 and 1010, associated with the devices 1005 and 1015 can have a smaller power capacity than the power sources 1020 and 1030 because devices 1005 and 1015 are smaller than the dual function members 1025, 1035, associated with the power sources 1020, 1030, respectively. The system can balance power between any combination of two or more power sources 1000, 1010, 1020, 1030, 1040.

A processor 1050 associated with at least one of the dual function members 1025, 1035, can receive a request for more power from at least one of the devices 1005, 1015. The processor 1050 can determine which power source 1000, 1010, 1020, 1030, to activate. The processor can activate the power source closest to the power source requesting additional power. For example, if the power source 1000 is requesting more power, the processor 1050 can activate power source 1020 because the power source 1020 is the closest to the power source 1000.

In another example, the processor 1050 can take into account both the distance and an amount of power associated with a power source that could provide more power. If the power source 1000 is requesting more power, the processor 1050 can determine that both power sources 1020, 1040, are good candidates based on the distance, with the power source 1020 being closer to the power source 1000. However, an amount of power remaining in the power source 1040 can be higher than the amount of power remaining in the power source 1020. Consequently, the processor can activate the power source 1042 to transfer power to the power source 1000.

In a third example, the processor 1050 can take into account the amount of processing power associated with a power source that could provide more power. If the power source that could provide more power has a processor, then a power intensive task can be transferred from the power source requesting more power to the power source that could provide more power, with or without wirelessly charging the requesting power source. In a more specific example, if the power source 1000 is requesting more power, the processor 1050 can determine that the power source 1020 has the processor 1050 associated with it. The processor 1050 can also determine that the most power intensive task is personalizing an audio according to the hearing profile of the user. Consequently, the processor 1050 can take on personalizing the audio according to the hearing profile of the user and can send the personalized audio to the device 1005 associated with the power source 1000. As a result, the power source 1000 does not need to supply as much power as before.

Figure 11:
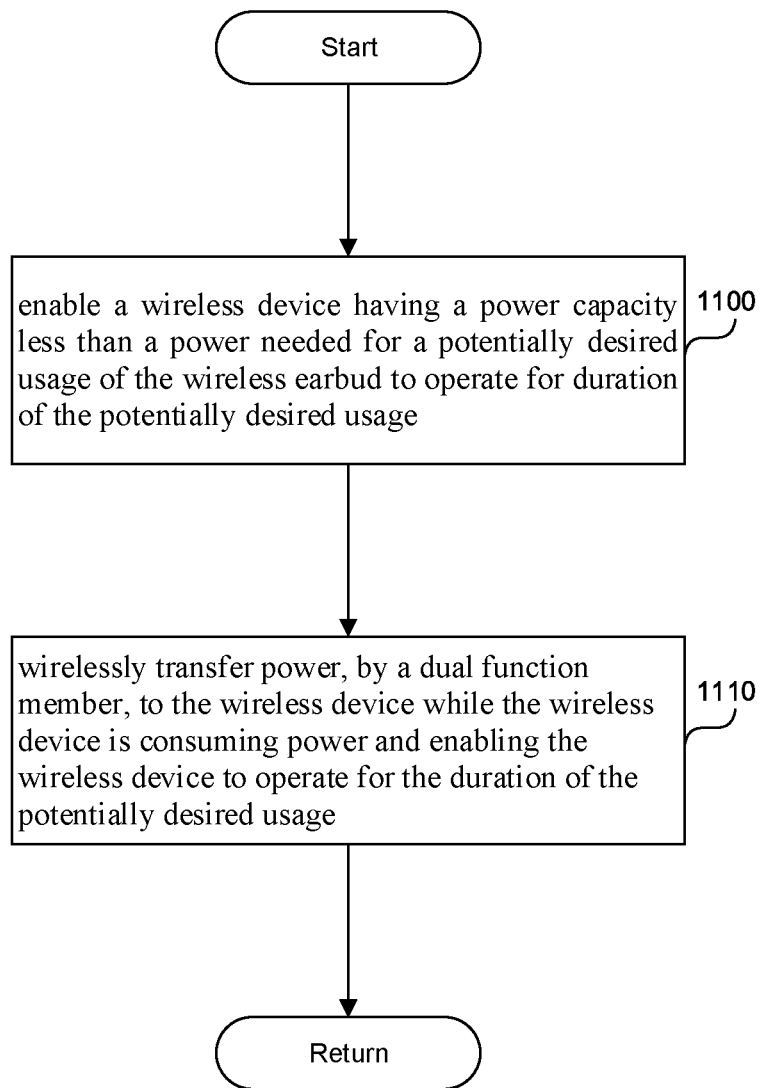
FIG. 11 is a flowchart of a method to wirelessly transfer power between a dual function member and a wireless audio device.

FIG. 11 is a flowchart of a method to wirelessly transfer power between a dual function member and a wireless audio device. In step 1100, the dual function member can enable a wireless audio device having a power capacity less than a power needed for a potentially desired usage of the wireless ear-bud to operate for a duration of the potentially desired usage.

In step 1110, the dual function member can wirelessly transfer power to the wireless audio device while the wireless audio device is consuming power, thus enabling the wireless audio device to operate for the duration of the potentially desired usage. For example, the wireless audio device can be an ear-bud having a power source capable of operating continuously for up to 5 hours. The user, however, may want to use the ear-buds for more than 5 hours. Currently, the user has to remove the ear-buds, charge them, and then resume using the ear-buds. By wirelessly transferring power to the ear-buds, while the ear-buds are in operation, the user can continue using the ear-buds for more than 5 hours.

The dual function member can have a first function and a second function. The first function can include wirelessly transferring power to the wireless audio device, and the second function can be different from the first function. For example, the second function can be to play audio, to be decorative, to correct vision, to hold the hair back, to carry objects, to act as clothing, etc. The dual function member itself can be charged wirelessly using the wireless audio device and/or a third power source.

A processor can modulate the power field emitted by the power source to transmit data. The power field can be an electromagnetic field. The modulation can include a frequency modulation, an amplitude modulation or a phase modulation, as explained in this application.

The wireless audio device can monitor its power. When the power of the wireless audio device is below a predefined threshold, the wireless audio device can activate the power source of the dual function member. The predefined threshold can be 80% of the total amount of power of a power source associated with the wireless audio device. The dual function member, upon receiving a request for more power from the wireless audio device, can automatically determine which power source to activate to transfer power to the wireless audio device.

For example, the dual function member can determine the closest power source, a power source with the most amount of power, or the dual function member can redistribute power intensive tasks away from the wireless audio device. In another example, the dual function member can use movable magnets to shape the power field transferring power to the wireless audio device. That way, the power field emanating from one power source can be shaped to transfer power to a left ear-bud and can also be shaped to transfer power to a right ear-bud. The movable magnets can be micro electro mechanical system (MEMS) magnets.

Upon receiving a request from the wireless audio device to activate the power source associated with the dual function member, the dual function member can determine which power source to activate. The dual function member can choose the power source among multiple power sources based on the distance between the power source and the wireless audio device or based on an amount of power contained within the power source in the plurality of power sources.

Figure 12:
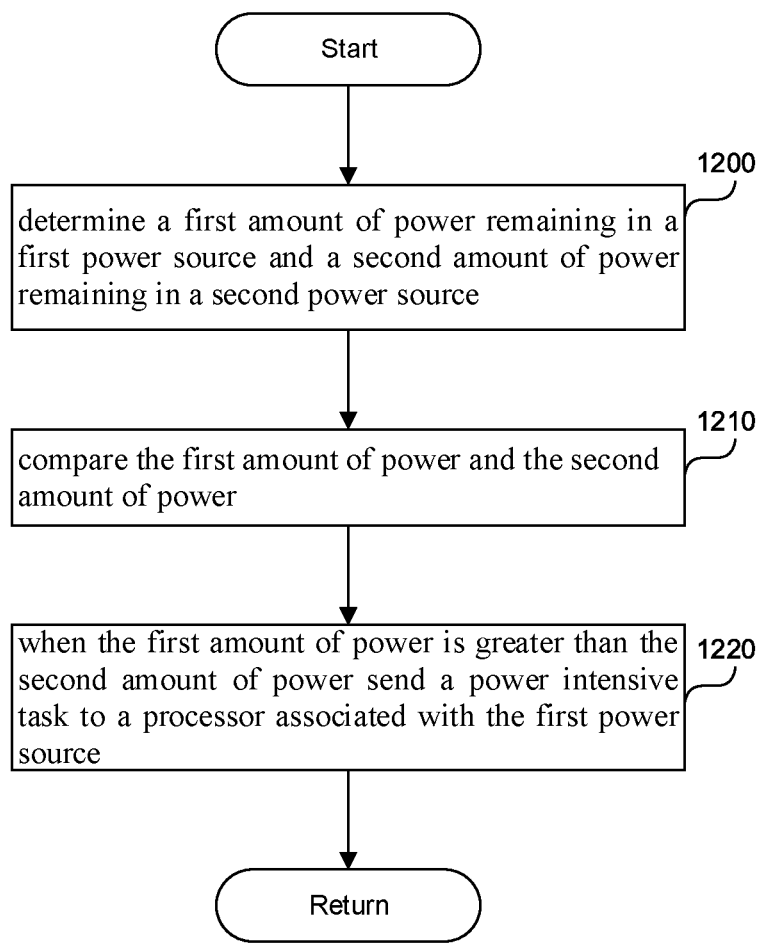
FIG. 12 is a flowchart of a method to balance power among multiple power sources.

FIG. 12 is a flowchart of a method to balance power among multiple power sources. In step 1200, the processor can determine the first amount of power remaining in a first power source associated with a wearable audio system and the second amount of power remaining in a second power source associated with the wearable audio system. The wearable audio system can be any combination of a headset, a headset with ear-buds, two ear-buds, a hearing aid, etc.

In step 1210, the processor can compare the first amount of power and the second amount of power. In step 1220, when the first amount of power is greater than the second amount of power, the processor can send a power intensive task to a processor associated with the first power source. A power intensive task can include modifying audio based on the hearing profile of the user, to enhance the user's perception of music.

For example, a power source associated with an ear-bud could be low on power when the ear-bud needs to modify audio based on the user's hearing profile. The ear-bud can transfer the task to a processor associated with an ear-cup because a power source associated with the ear-cup has more power than the power source associated with the ear-bud. The ear-cup can modify the audio based on the user's hearing profile and transfer the modified audio to the ear-bud.

A processor can obtain a hearing profile associated with a user. The hearing profile can correlate a received frequency and a received amplitude to a perceived frequency and a perceived amplitude. The processor can send the power intensive task to modify audio based on the hearing profile to the processor associated with the first power source, and then play the modified audio to the user. In another example, if the user is wearing only two ear-buds, the processor can determine which of the two ear-buds has more power and can transfer the audio modification task to the ear-bud with more power.

In another example, the power intensive task can include a wireless communication with a remote device, such as a phone, a tablet, a wireless router or a cell tower. For example, if the user is wearing an ear-cup and an ear-bud, the ear-cups can have a bigger power source, e.g., a battery, then the ear-buds, and the wireless communication session such as Bluetooth communication, Wi-Fi communication, and/or cell tower communication can be done by the ear-cups. The ear-cups can then transfer the received audio to the ear-buds, so that the ear-buds need only receive the audio and play the audio. Receiving and playing the audio consume less power than the wireless communication.

To optimally distribute power intensive tasks, the processor can determine a first amount of power needed for a first task and a second amount of power needed for a second task. When the first amount of power is greater than the second amount of power, the processor can send the first task to the processor associated with the first power source. To determine the amount of power associated with the task, the processor can retrieve a table stored in memory indicating an expected amount of power associated with various tasks or running programs.

The wearable audio system can include the first power source associated with a first ear-bud, the second power source associated with a second ear-bud, and a third power source associated with an ear-cup. The processor can determine a third amount of power remaining in a third power source associated with the ear-cup. The processor can compare the first amount of power, the second amount of power, and the third amount of power. When the third amount of power is greater than the second amount of power and the first amount of power, the processor can send a power intensive task to a processor associated with the third power source.

Computer

Figure 13:
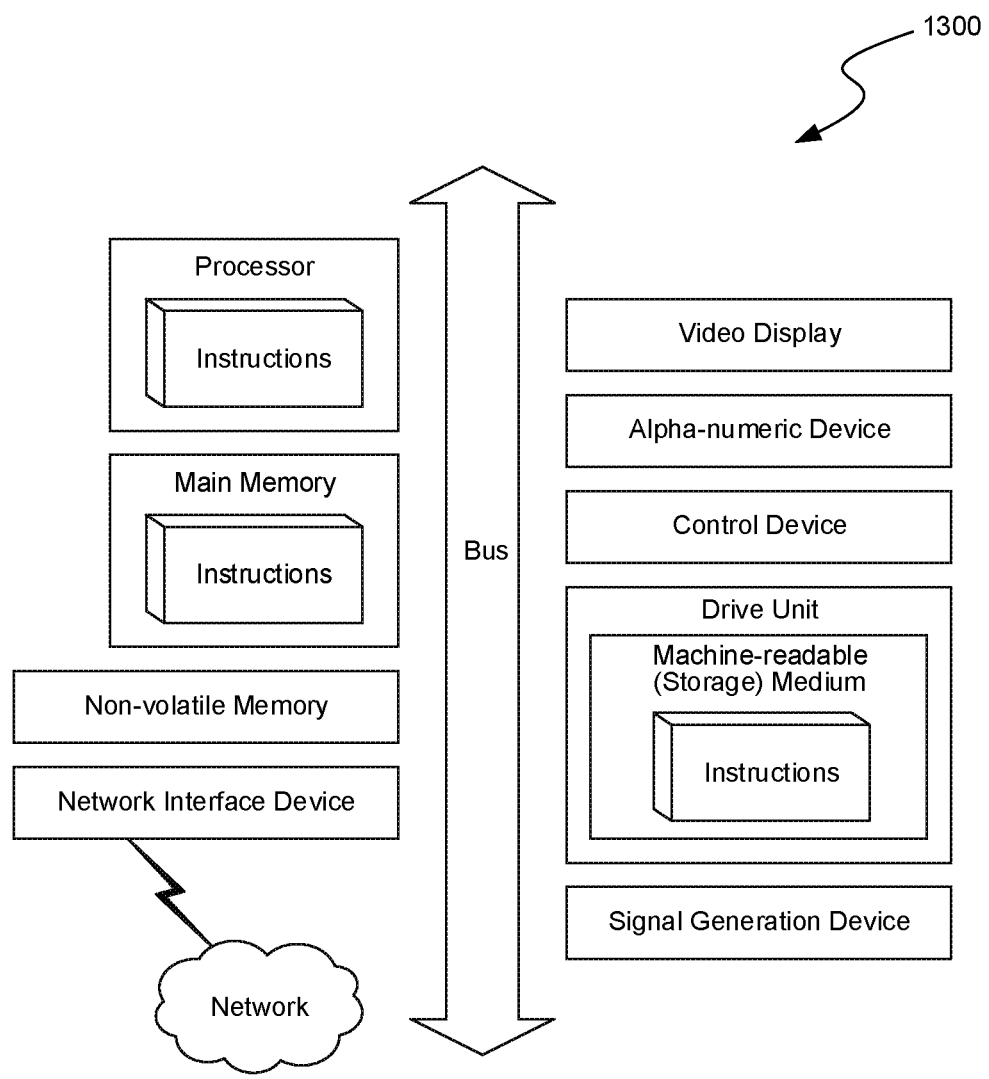
FIG. 13 is a diagrammatic representation of a machine in the example form of a computer system within which a set of instructions, for causing the machine to perform any one or more of the methodologies or modules discussed herein, may be executed.

FIG. 13 is a diagrammatic representation of a machine in the example form of a computer system 1300 within which a set of instructions, for causing the machine to perform any one or more of the methodologies or modules discussed herein, may be executed.

In the example of FIG. 13, the computer system 1300 includes a processor, memory, non-volatile memory, and an interface device. Various common components (e.g., cache memory) are omitted for illustrative simplicity. The computer system 1300 is intended to illustrate a hardware device on which any of the components described in the example of FIGS. 1-12 (and any other components described in this specification) can be implemented. The computer system 1300 can be of any applicable known or convenient type. The components of the computer system 1300 can be coupled together via a bus or through some other known or convenient device.

The computer system 1300 can be included in the dual function member such as 810, 820, 830, 840, 850, 860 in FIG. 8, and 905 in FIG. 9B. The computer system 1300 can be included in the wireless audio device such as 905 in FIG. 9B. The processor of the computer system 1300 can perform the various steps described in this application. The network of the computer system 1300 can be the wireless network facilitating communication between the dual function member and the wireless audio device.

This disclosure contemplates the computer system 1300 taking any suitable physical form. As example and not by way of limitation, the computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system 1300 may include one or more computer systems 1300; be unitary or distributed; span multiple locations; span multiple machines; or reside in a cloud, which may include one or more cloud components in one or more networks. Where appropriate, one or more computer systems 1300 may perform-without substantial spatial or temporal limitation-one or more steps of one or more methods described or illustrated herein. As an example, and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" will include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood, that for software to run, if necessary, it may be moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1300. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 13 reside in the interface.

In operation, the computer system 1300 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and which cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs. The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purpose of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristic, feature, or aspect of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, to the scope of the embodiments, which is set forth in the following claims.

The invention claimed is:

1. A system comprising:
a wireless ear-bud configured to wirelessly receive a first audio signal and to emit the first audio signal; and
a wearable device configured to be secured in proximity to the wireless ear-bud, wherein the wearable device is configured to wirelessly transfer power to the wireless ear-bud while the wireless ear-bud is operating and to emit audio;
wherein the wireless ear-bud is configured to monitor an amount of power associated with the wireless ear-bud, and when the amount of power of the wireless ear-bud is below a predefined threshold, the wireless ear-bud further configured to activate a first power source of the wearable device.

2. The system of claim 1, wherein the wireless ear-bud comprises a first power source and the wearable device comprises a second power source.

3. The system of claim 2, wherein the first power source comprises a capacitor.

4. The system of claim 2, wherein the second power source comprises a battery.

5. The system of claim 2, wherein the first power source is configured to transfer power and an audio signal.

6. The system of claim 1, wherein in response to receiving a request from the wireless ear-bud to activate a first power source, the wearable device configured to select a power source from a plurality of power sources based on a distance from each of the plurality of power sources to the wireless ear-bud or based on an amount of power remaining in the power source from the plurality of power sources.

7. The system of claim 1, wherein the system is configured to receive an incoming audio signal, and in response, coordinate between the wireless ear-bud and the wearable device to split the incoming audio signal, wherein splitting the incoming audio signal comprises:
the wireless ear-bud configured to emit the first audio signal comprising high frequencies; and
the wearable device configured to emit a second audio signal comprising low frequencies.

8. A system comprising:
a first wireless wearable device configured to wirelessly receive a first audio signal and further configure to emit sound towards an ear of a user based on the first audio signal; and
a second wireless wearable device configured to be secured in proximity to the first wireless wearable device, wherein the second wireless wearable device is configured to wirelessly transfer power to the first wireless wearable device while the first wireless wearable device is operating, wherein the system is configured to receive an incoming audio signal, and in response, coordinate between the first wireless wearable device and the second wireless wearable device to split the incoming audio signal, wherein splitting the incoming audio signal comprises:
the first wireless wearable device configured to emit the first audio signal comprising high frequencies; and
the second wireless wearable device configured to emit a second audio signal comprising low frequencies.

9. The system of claim 8, wherein the first wireless wearable device is configured to monitor an amount of power associated with the first wireless wearable device, and when the amount of power of the first wireless wearable device is below a predefined threshold, the first wireless wearable device is further configured to activate a first power source of the second wireless wearable device.

10. The system of claim 8, wherein in response to receiving a request from the first wireless wearable device to activate a first power source, the second wireless wearable device configured to select a power source from a plurality of power sources based on a distance from each of the plurality of power sources to the first wireless wearable device or based on an amount of power remaining in the power source from the plurality of power sources.

11. A system comprising:
a first wireless wearable device configured to wirelessly receive a first audio signal and further configured to emit sound towards an ear of a user based on the received first audio signal; and
a second wireless wearable device configured to be secured in proximity to the first wireless wearable device, wherein the second wireless wearable device is configured to wirelessly transfer power to the first wireless wearable device while the first wireless wearable device is operating, wherein the first wireless wearable device is configured to monitor an amount of power associated with the first wireless wearable device, and when the amount of power of the first wireless wearable device is below a predefined threshold, the first wireless wearable device is further configured to activate a first power source of the second wireless wearable device.

12. The system of claim 11, wherein the first wireless wearable device comprises wearable glasses.

13. The system of claim 11, wherein the first wireless wearable device comprises an ear-bud.

14. The system of claim 11, wherein the second wireless wearable device comprises an ear-cup.

15. The system of claim 11, wherein the second wireless wearable device comprises a headband.

* * * * *